US012664023B2

(12) United States Patent
Lewellen

(10) Patent No.: US 12,664,023 B2
(45) Date of Patent: Jun. 23, 2026

(54) CLOUD ARCHITECTURE GENERATION, SIMULATION, AND OPTIMIZATION

(71) Applicant: Oracle International Corporation, Redwood Shores, CA (US)

(72) Inventor: Garrett Lewellen, Longmont, CO (US)

(73) Assignee: Oracle International Corporation, Redwood Shores, CA (US)

( * ) Notice: Subject to any disclaimer, the term of this patent is extended or adjusted under 35 U.S.C. 154(b) by 381 days.

(21) Appl. No.: 18/116,225

(22) Filed: Mar. 1, 2023

(65) Prior Publication Data
US 2024/0296072 A1      Sep. 5, 2024

(51) Int. Cl.
*G06F 9/50*          (2006.01)
(52) U.S. Cl.
CPC ............ *G06F 9/505* (2013.01); *G06F 9/5072* (2013.01)
(58) Field of Classification Search
CPC ...... G06F 9/505; G06F 9/5072; G06F 9/5027; G06F 9/5038
See application file for complete search history.

(56) References Cited

U.S. PATENT DOCUMENTS 12,056,646 B1 * 8/2024 Ong ........................ G06Q 50/40
2021/0295224 A1 * 9/2021 Dorofiyenko ............ G06N 5/04

OTHER PUBLICATIONS

"Business Events and Event Delivery Network," Oracle, Retrieved from https://docs.oracle.com/cd/E12839_01/doc.1111/e10223/06_business_events.htm, Retrieved on Mar. 6, 2024, pp. 2.
"Goal of Service-Oriented Architecture," Oracle, Retrieved from https://docs.oracle.com/cd/E12839_01/doc.1111/e10223/soa_02.htm, Retrieved on Mar. 6, 2024, pp. 2.
"Human Workflow," Oracle, Retrieved from https://docs.oracle.com/cd/E12839_01/doc.1111/e10223/12_human_workflow.htm, Retrieved on Mar. 6, 2024, pp. 2.
"Introduction to Oracle SOA Suite Components," Oracle, Retrieved from https://docs.oracle.com/cd/E12839_01/doc.1111/e10223/01_components.htm, Retrieved on Mar. 6, 2024, pp. 2.
"Introduction to Oracle SOA Suite," Oracle, Retrieved from https://docs.oracle.com/cd/E12839_01/doc.1111/e10223/suite_01.htm, Retrieved on Mar. 6, 2024, pp. 2.
"Introduction to Service-Oriented Architecture," Oracle, Retrieved from https://docs.oracle.com/cd/E12839_01/doc.1111/e10223/soa_01.htm, Retrieved on Mar. 6, 2024, pp. 2.

(Continued)

*Primary Examiner* — Adam Lee
(74) *Attorney, Agent, or Firm* — Invoke

(57)          ABSTRACT

Techniques for generating, simulating, and optimizing one or more provider-specific cloud-based architectures from a provider-independent architecture definition are disclosed. An architecture generator maps provider-independent service definitions to provider-specific service components for one or more specific cloud service providers. An architecture simulator simulates execution of a set of operations on the provider-specific cloud-based architectures to determine one or more performance and cost metrics. An architecture optimizer varies one or more design choices or parameters of a provider-specific service component to suggest which variant is optimal with respect to an optimization objective.

38 Claims, 12 Drawing Sheets

(56) References Cited

OTHER PUBLICATIONS

"Life Cycle of a SOA Composite Application," Oracle, Retrieved from https://docs.oracle.com/cd/E12839_01/doc.1111/e10223/arch_01.htm, Retrieved on Mar. 6, 2024, pp. 2.

"Oracle Adapters," Oracle, Retrieved from https://docs.oracle.com/cd/E12839_01/doc.1111/e10223/05_adapters.htm, Retrieved on Mar. 6, 2024, pp. 2.

"Oracle B2B," Oracle, Retrieved from https://docs.oracle.com/cd/E12839_01/doc.1111/e10223/16_b2b.htm, Retrieved on Mar. 6, 2024, pp. 2.

"Oracle BPEL Process Manager," Oracle, Retrieved from https://docs.oracle.com/cd/E12839_01/doc.1111/e10223/10_bpel.htm, Retrieved on Mar. 6, 2024, pp. 2.

"Oracle Business Activity Monitoring," Oracle, Retrieved from https://docs.oracle.com/cd/E12839_01/doc. 1111/e10223/13_bam.htm, Retrieved on Mar. 6, 2024, pp. 2.

"Oracle Business Intelligence," Oracle, Retrieved from https://docs.oracle.com/cd/E12839_01/doc.1111/e10223/509_bi.htm, Retrieved on Mar. 6, 2024, pp. 2.

"Oracle Business Process Analysis Suite," Oracle, Retrieved from https://docs.oracle.com/cd/E12839_01/doc.1111/e10223/506_bpa.htm, Retrieved on Mar. 6, 2024, pp. 2.

"Oracle Business Process Management Suite," Oracle, Retrieved from https://docs.oracle.com/cd/E12839_01/doc.1111/e10223/505_bpm.htm, Retrieved on Mar. 6, 2024, pp. 2.

"Oracle Business Rules," Oracle, Retrieved from https://docs.oracle.com/cd/E12839_01/doc.1111/e10223/08_business_rules.htm, Retrieved on Mar. 6, 2024, pp. 2.

"Oracle Complex Event Processing," Oracle, Retrieved from https://docs.oracle.com/cd/E12839_01/doc.1111/e10223/14_cep.htm, Retrieved on Mar. 6, 2024, pp. 2.

"Oracle Data Integrator," Oracle, Retrieved from https://docs.oracle.com/cd/E12839_01/doc.1111/e10223/508_odi.htm, Retrieved on Mar. 6, 2024, pp. 2.

"Oracle Enterprise Manager," Oracle, Retrieved from https://docs.oracle.com/cd/E12839_01/doc.1111/e10223/18_em.htm, Retrieved on Mar. 6, 2024, pp. 2.

"Oracle Event-Driven Architecture Suite," Oracle, Retrieved from https://docs.oracle.com/cd/E12839_01/doc.1111/e10223/507_eda.htm, Retrieved on Mar. 6, 2024, pp. 2.

"Oracle JDeveloper," Oracle, Retrieved from https://docs.oracle.com/cd/E12839_01/doc.1111/e10223/17_jdev.htm, Retrieved on Mar. 6, 2024, pp. 2.

"Oracle Mediator," Oracle, Retrieved from https://docs.oracle.com/cd/E12839_01/doc.1111/e10223/03_mediator.htm, Retrieved on Mar. 6, 2024, pp. 2.

"Oracle Metadata Repository," Oracle, Retrieved from https://docs.oracle.com/cd/E12839_01/doc.1111/e10223/07_mds.htm, Retrieved on Mar. 6, 2024, pp. 2.

"Oracle Service Bus," Oracle, Retrieved from https://docs.oracle.com/cd/E12839_01/doc.1111/e10223/04_osb.htm, Retrieved on Mar. 6, 2024, pp. 2.

"Oracle Service Registry," Oracle, Retrieved from https://docs.oracle.com/cd/E12839_01/doc.1111/e10223/502_uddi.htm, Retrieved on Mar. 6, 2024, pp. 2.

"Oracle SOA Governance Suite," Oracle, Retrieved from https://docs.oracle.com/cd/E12839_01/doc.1111/e10223/504_gov.htm, Retrieved on Mar. 6, 2024, pp. 2.

"Oracle SOA Suite Standards," Oracle, Retrieved from https://docs.oracle.com/cd/E12839_01/doc.1111/e10223/suite_02.htm, Retrieved on Mar. 6, 2024, pp. 2.

"Oracle User Messaging Service," Oracle, Retrieved from https://docs.oracle.com/cd/E12839_01/doc.1111/e10223/15_message.htm, Retrieved on Mar. 6, 2024, pp. 2.

"Oracle WSM Policy Manager," Oracle, Retrieved from https://docs.oracle.com/cd/E12839_01/doc.1111/e10223/09_policy_mgr.htm, Retrieved on Mar. 6, 2024, pp. 2.

"Other Adapters," Oracle, Retrieved from https://docs.oracle.com/cd/E12839_01/doc.1111/e10223/503_other_adapters.htm, Retrieved on Mar. 6, 2024, pp. 2.

"Separately Licensed Products," Oracle, Retrieved from https://docs.oracle.com/cd/E12839_01/doc.1111/e10223/501_licensed.htm, Retrieved on Mar. 6, 2024, pp. 2.

"Service Infrastructure," Oracle, Retrieved from https://docs.oracle.com/cd/E12839_01/doc.1111/e10223/02_service_infrastructure.htm, Retrieved on Mar. 6, 2024, pp. 2.

"SOA Composite Application Architecture," Oracle, Retrieved from https://docs.oracle.com/cd/E12839_01/doc.1111/e10223/arch_02.htm, Retrieved on Mar. 6, 2024, pp. 2.

"Spring Context," Oracle, Retrieved from https://docs.oracle.com/cd/E12839_01/doc.1111/e10223/11_spring.htm, Retrieved on Mar. 6, 2024, pp. 2.

"Welcome to Oracle SOA Suite," Oracle, Retrieved from https://docs.oracle.com/cd/E12839_01/doc.1111/e10223/index.htm, Retrieved on Mar. 6, 2024, pp. 2.

Jammal et al., "Generic input template for cloud simulators: A case study of CloudSim", Nov. 26, 2018, vol. 49, pp. 720-747.

* cited by examiner

Provider-independent Architecture Definition
202

User-selected Component
126

Provider-Independent Service Description
121

Connections
203

Selection of cloud provider(s)
205

Architecture Generator
112

Provider-Specific Architecture Mapping
122

Provider-specific Architecture
204

User-selected Component
126

System-selected Service Component
124

Connections
203

Receive a provider-specific architecture
702

Select a provider-specific service component to vary in
the provider-specific architecture
704

Optimize the provider-specific architecture with respect
to an objective based on varying the provider-specific
service component
706

Present the optimized provider-specific architecture
708

CLOUD ARCHITECTURE GENERATION, SIMULATION, AND OPTIMIZATION

TECHNICAL FIELD

The present disclosure relates to simulating and measuring performance of provider-specific cloud-based architectures that have been generated using provider-independent cloud-based architecture templates.

BACKGROUND

Cloud-based services provide computing resources, such as data storage, data processing, and networking services, for use by third parties who wish to provide their own services to their customers without having to invest in, manage, and maintain their own physical computing and network resources.

To use a cloud-based service, a user selects which cloud service to use, and may need to select one or more cloud service components to use to host their particular service. As an example, a user may select from data storage components, database management components, data processing components, and compute shapes to configure an architecture for their service. A cloud architecture refers to the particular set of cloud components and the user's provided components that are used together to provide the user's service. The choice of particular cloud components may affect the monetary cost of using the cloud service as well as the time needed to complete the tasks to be performed by the components in the architecture.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM OVERVIEW
3. ARCHITECTURE GENERATOR
4. ARCHITECTURE SIMULATOR
5. ARCHITECTURE OPTIMIZER
6. OPERATIONS FOR GENERATING A PROVIDER-SPECIFIC ARCHITECTURE
7. OPERATIONS FOR SIMULATING A PROVIDER-SPECIFIC ARCHITECTURE
8. OPERATIONS FOR OPTIMIZING A PROVIDER-SPECIFIC ARCHITECTURE
9. EXAMPLE EMBODIMENTS
10. COMPUTER NETWORKS AND CLOUD NETWORKS
11. HARDWARE OVERVIEW
12. MISCELLANEOUS; EXTENSIONS

1. General Overview

One or more embodiments simulate provider-specific cloud architectures to generate and present corresponding performance metrics. The system generates provide-specific cloud architectures, corresponding to respective cloud-based systems, from a same provider-independent architecture definition. The provider-independent architecture definition includes user-selected components, service components, and connections representing data flows. The system generates each provider-specific architecture, for a corresponding cloud provider, by mapping the descriptions of the service components to system-selected service components for the corresponding cloud provider. Furthermore, the system incorporates the user-selected components, specified in the provided-independent architecture definition, into the provider-specific architecture. Finally, the system configures the data flows represented by the connections in the provider-independent architecture definitions. The system simulates operations on each of the provider-specific architectures, corresponding respectively to various cloud providers, to generate and present performance metrics.

One or more embodiments described in this Specification and/or recited in the claims may not be included in this General Overview section.

2. System Overview

Figure 1A:
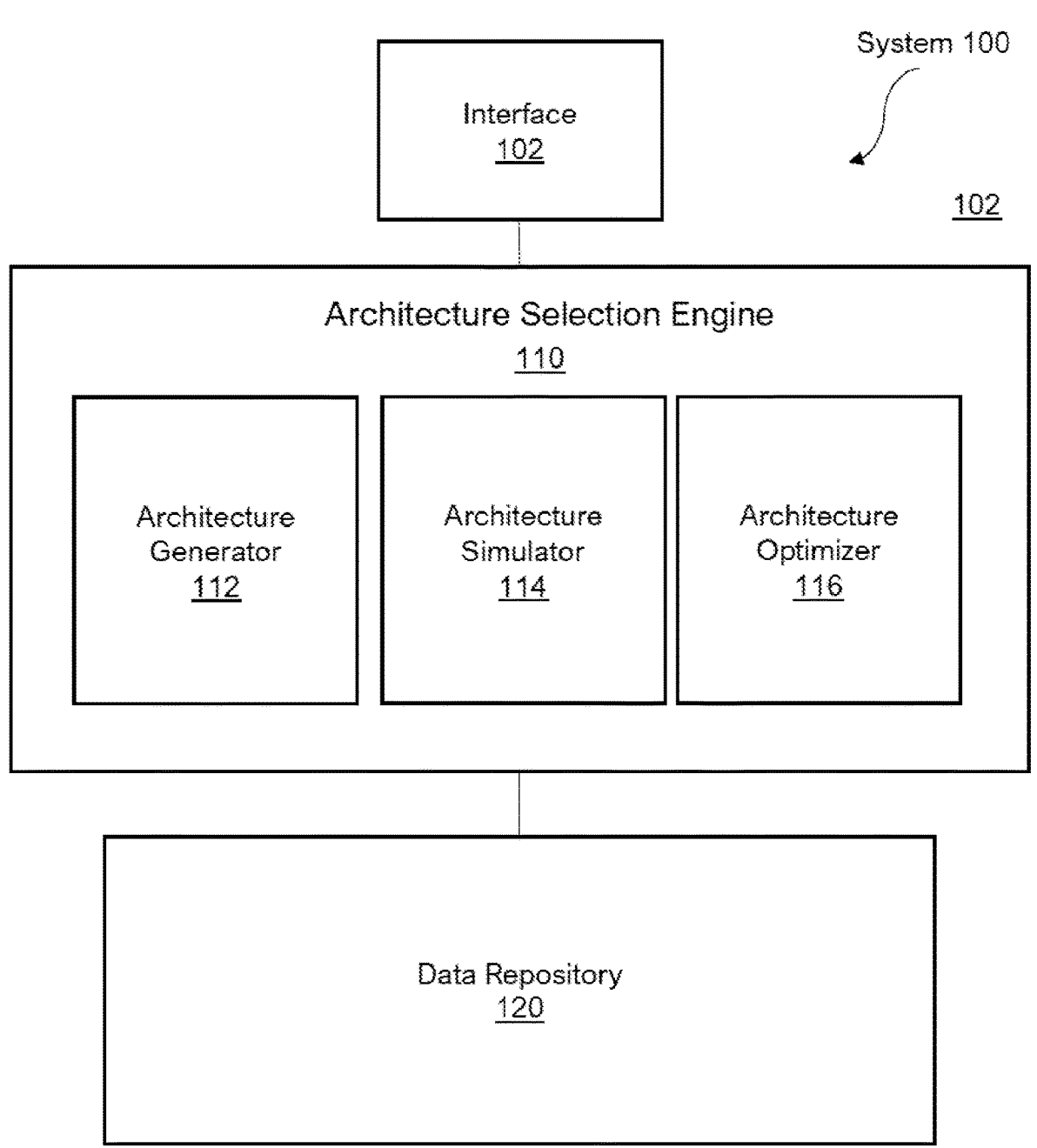
FIGS. 1A and 1B illustrates a system in accordance with one or more embodiments.

FIG. 1A illustrates a system 100 in accordance with one or more embodiments. As illustrated in FIG. 1, system 100 includes an interface 102, an architecture selection engine 110, and a data repository 120. In one or more embodiments, the architecture selection engine 110 may include one or more functional components such as an architecture generator 112, an architecture simulator 114, and an architecture optimizer 116.

In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiments, the architecture selection engine 110 refers to hardware and/or software configured to perform operations described herein for generating a cloud service architecture, simulating an architecture, and optimizing an architecture. Examples of operations for generating, simulation, and optimizing are described below with reference to FIGS. 2-8.

In one or more embodiments, the architecture generator 112 refers to software and/or hardware configured to receive a provider-independent architecture definition and generate one or more provider-specific architectures from the provider-independent architecture definition. Examples of operations for generating provider-specific architectures are described below with reference to FIGS. 2 and 5.

In one or more embodiments, the architecture simulator 114 refers to software and/or hardware configured to receive a provider-specific architecture and simulate operation of the provider-specific architecture on a set of operations to determine one or more performance metrics. Examples of operations for simulating provider-specific architectures are described below with reference to FIGS. 3 and 6.

In one or more embodiments, the architecture optimizer 116 refers to software and/or hardware configured to receive a provider-independent architecture definition and to optimize the provider-specific architecture by varying one or more aspects of the provider-specific architecture and comparing performance across the variations to identify an optimal provider-specific architecture varying according to an objective and/or constraint. Examples of operations for optimizing provider-specific architectures are described below with reference to FIGS. 4 and 7.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or executed on the same computing system as the architecture selection engine 110. Alternatively, or additionally, a data repository 120 may be implemented or executed on a computing system separate from the architecture selection engine 110. The data repository 120 may be communicatively coupled to the architecture selection engine 110 via a direct connection or via a network.

Figure 1B:
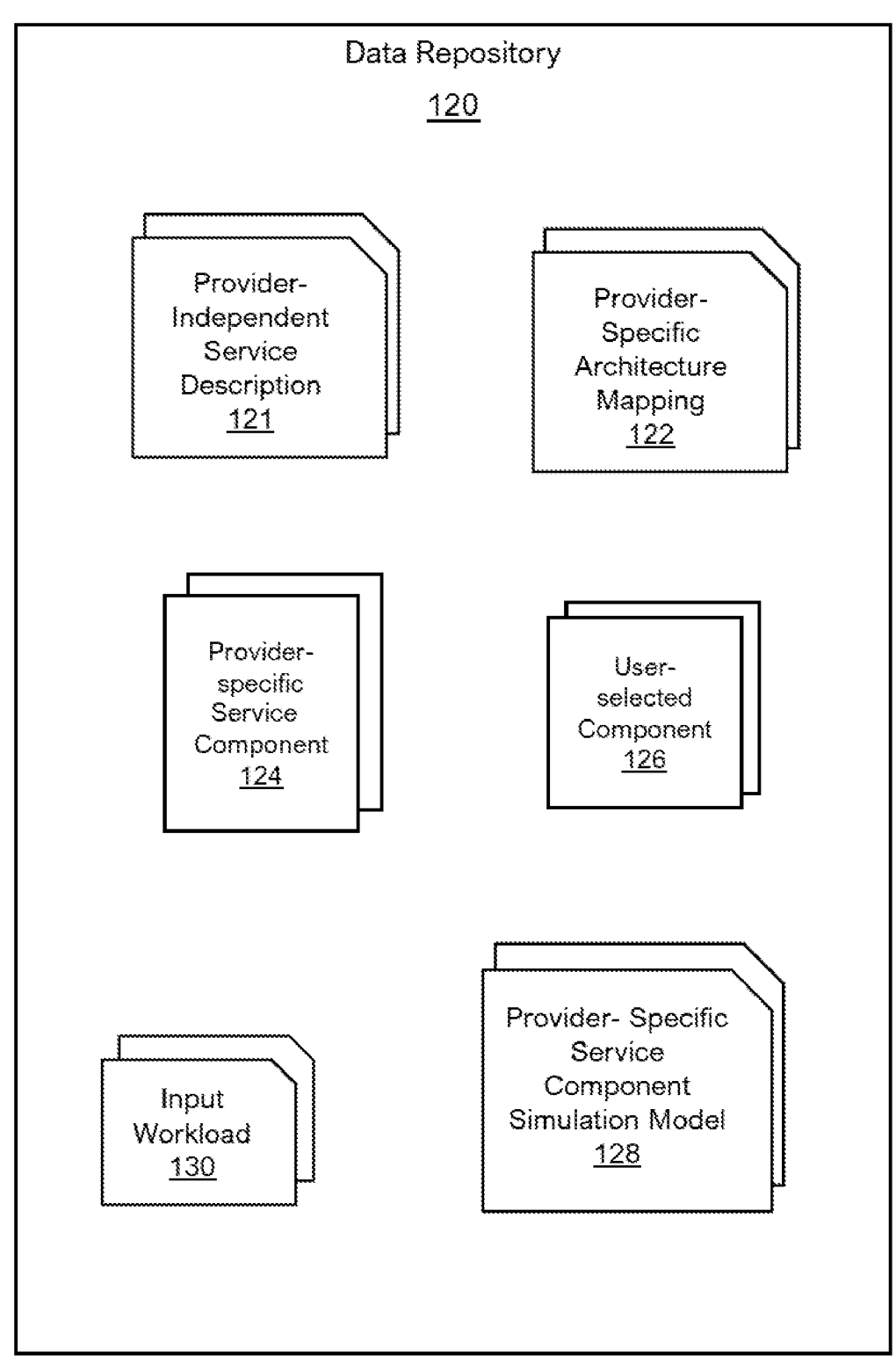

The data repository 120 may store one or more data elements used by the architecture selection engine 110. As shown in FIG. 1B, for example, the data repository 120 may include a set of provider-independent service descriptions 121, a set of provider-specific architecture mappings 122, a set of provider-specific service components 124, a set of user-selected components 126, a set of provider-specific service component simulation models 128, and a set of input workloads 130. Information used by the architecture selection engine 110 may be implemented across any of components within the system 100. However, this information is illustrated within the data repository 120 for purposes of clarity and explanation.

In one or more embodiments, a provider-independent service description 121 may include a description of a cloud-based service without reference to any specific cloud provider implementation. Some provider-independent service descriptions may include, for example, a multi-tenant virtual machine, batch data processing, key-value object storage, a virtual network, an organizing resource, or an account service. Some provider-independent service descriptions may include additional parameters. For example, a multi-tenant virtual machine description may include a parameter for a size of a compute shape for the multi-tenant virtual machine. For some services, a particular brand name product may be specified as a provider-independent service description, e.g., an ORACLE database, however, the provider-independent service description may not specify a particular version or implementation of the product, as different cloud service providers may use different versions.

In one or more embodiments, a provider-specific architecture mapping 122 may include a process and/or data structure that maps a provider-independent service description to a provider-specific service component 124. The data repository 120 may include a provider-specific architecture mapping 122 for each cloud service provider supported by the engine 110. For a given specific cloud service provider, the mapping 122 may be a decision tree, a look-up table, or any other data structure and/or logic that receives a provider-independent service description and outputs a provider-specific service component for that cloud service provider.

A provider-specific architecture mapping 122 may also include logic to resolve cases where one provider-independent service description maps to more than one provider-specific service components or to no provider-specific service components. The logic to resolve one-to-many mappings in a given provider-specific architecture mapping 122 may be improved upon using a machine-learning model that incorporates feedback from users and/or from simulated performance metrics or actual performance metrics of the selected one of many components.

In one or more embodiments, a provider-specific service component 124 may define a cloud service component for a specific cloud service provider. For example, one cloud service provider, AMAZON WEB SERVICES (AWS), provides the AMAZON RELATIONAL DATABASE SERVICE as a managed relational database system, while another cloud service provider, ORACLE CLOUD INFRASTRUCTURE (OCI), provides the OCI BASE DATABASE SERVICE as a managed relational database system. Within the provider-specific service component, additional parameters and design choices may be selectable. For example, provider-specific service component may be available for different compute shapes. A compute shape represents a set of computational resources, e.g., a number of processing units and an amount of memory, that can be allocated to the provider-specific service component. Within a particular provider-specific service component, a small, medium or large compute shape could be selected. The provider-specific service components 124 are selected by the architecture generator 112.

In one or more embodiments, a user-selected component 126 may include software, metadata, or data provided and controlled by the user for deployment into the cloud-based architecture. The user-selected components 126 are included in a provider-specific architecture generated by the architecture generator 112.

In one or more embodiments, a provider-specific service component simulation model 128 may include software, metadata, and/or data that specifies how a related provider specific service component 124 operates on data. A model 128 may include, for example, a procedure for producing a new follow-on event from a received event, a procedure for estimating how long an event will take, a procedure for estimating what processing an event will cost, and/or parameters that can be adjusted to influence event cost and/or completion time in a given context. In one or more embodiments, the procedure for estimating the time or cost for processing an event may be implemented as a look-up table, a decision tree, or a machine-learning model. A model 128 may include a semantic model for a synchronous request type and a semantic model for an asynchronous request type.

In one or more embodiments, an input workload 130 may include a set of data and/or operations for use when simulating a provider-specific architecture. For example, an input workload may include a set of operations such as database queries or batch data processing operations. The models 128 and an input workload 130 may be used by the architecture simulator 114 to simulate the operation of a provider-specific architecture.

In one or more embodiments, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, interface 102 refers to hardware and/or software configured to facilitate communications between a user and the architecture selection engine 110. The interface 102 may include an architecture design interface for the architecture engine 110 that allows a user to select, arrange, connect, and configure user-selected components 126 and provider-independent service descriptions 121. Interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 102 is specified in one or more other languages, such as Java, C, or C++.

Additional embodiments and/or examples relating to computer networks are described below in Section 10, titled "Computer Networks and Cloud Networks."

3. Architecture Generator

Figure 2:
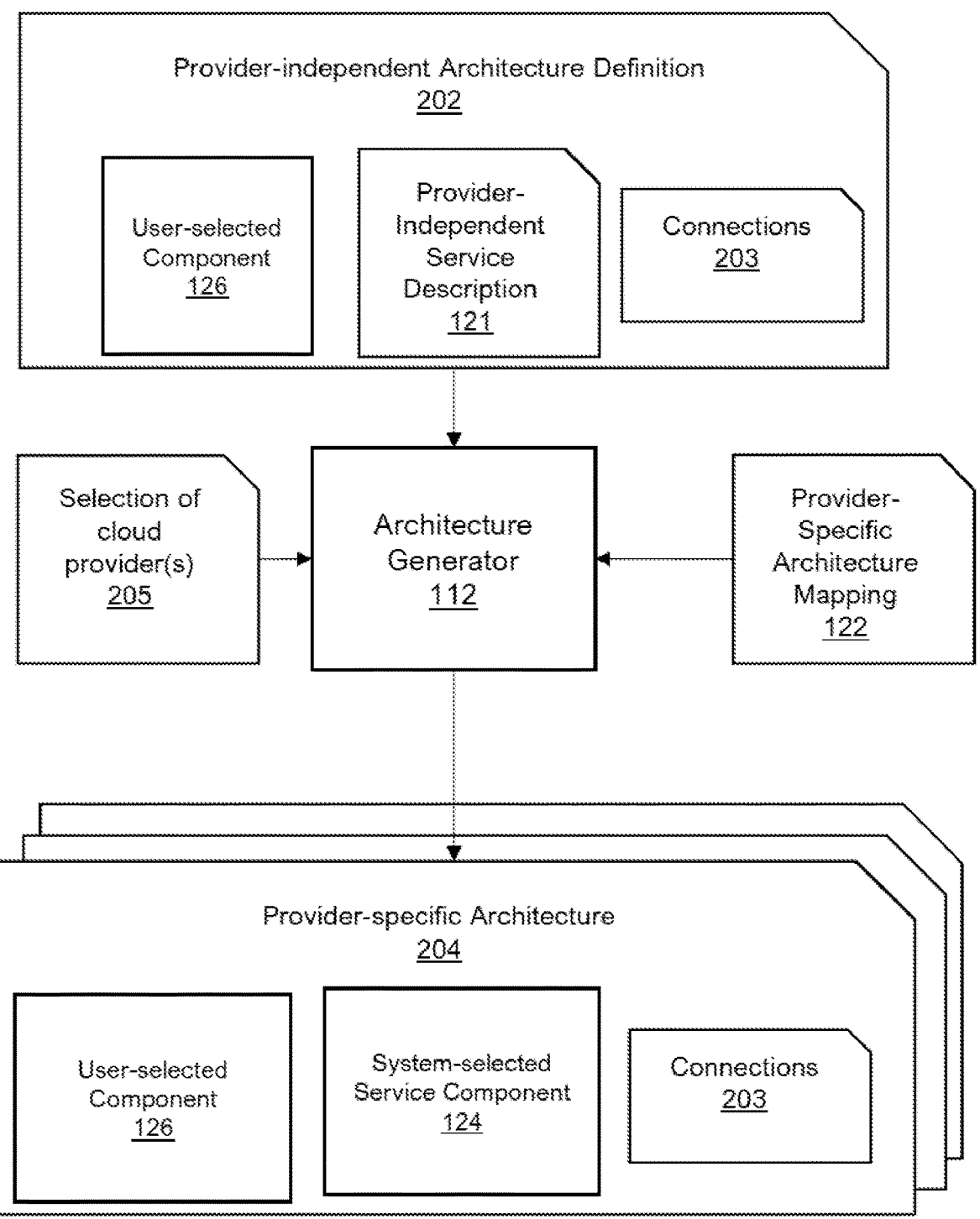
FIG. 2 illustrates a data flow diagram for an example of an architecture generator in accordance with one or more embodiments.

FIG. 2 illustrates an example data flow diagram for the architecture generator 112 in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

The architecture generator 112 may receive a provider-independent architecture definition 202 from a user. The definition 202 may be received, for example, via the interface 102. The definition 202 may include various elements, including a set of one or more user-selected components 126, a set of one or more provider-independent service descriptions 121, and a set of one or more connections 203. The connections 203 may represent the data flows between and among the user-selected components 126 and the provider-independent service descriptions 121. For example, the connections 203 may identify where an input to one component or description connects to an output of another component or description. The provider-independent architecture definition 202 may also include metadata that specifies an order in which the components of the architecture are executed or accessed in operation. An example of a provider-independent architecture definition is described below in reference to FIG. 8.

The architecture generator 112 may also receive a selection 205 of one or more cloud service providers for which to generate a provider-specific architecture. The selection 205 may be received from the user, for example, via the interface 102.

The architecture generator 112 may receive or retrieve a provider-specific architecture mapping 122 for each cloud service provider in the selection 205. The architecture generator 112 may apply the mapping 122 to the provider-independent service description(s) 121 in the definition 202 to identify and select a provider-specific service component 124 that corresponds to the provider-independent service description 121.

Once each provider-independent service description has been mapped to a respective provider-specific service component for a cloud service provider, the architecture generator 112 may generate a provider-specific architecture 204 for that cloud service provider. The provider-specific architecture 204 may include the user-selected components 126, the system-selected service components 124 and the connections 203.

The architecture generator 112 may configure one or more data flows according to the connections 203. For example, the architecture generator 112 may identify data types and/or formats to be input or output from the user-selected components 126. The architecture generator 112 may configure one or more data flows according to data flow information associated with a connection between a user-selected component and a system-selected component. The architecture generator 112 may configure one or more data flows according to data an interface element associated with first user-selected component and the first system-selected component; The architecture generator 112 may configure one or more data flows according to a previously configured provider-specific architecture that uses the same or similar system-selected component and the same or similar user-selected component. One or more embodiments may determine that additional connections are needed between components of the provider-independent architecture definition, beyond what the user provided. The architecture generator 112 may add those connections as system-selected connections to the provider-independent architecture definition.

The architecture generator 112 may repeat the generation process for each cloud provider in the selection 205, generating a plurality of provider-specific architectures. The provider-specific architectures 204 may be stored, for example, in the data repository 120. Stored architectures 204 may be used, for example, for future deployment and use at a cloud service, or as input for a machine learning model. Examples of provider-specific architectures are described below with reference to FIGS. 9 and 10.

4. Architecture Simulator

Figure 3:
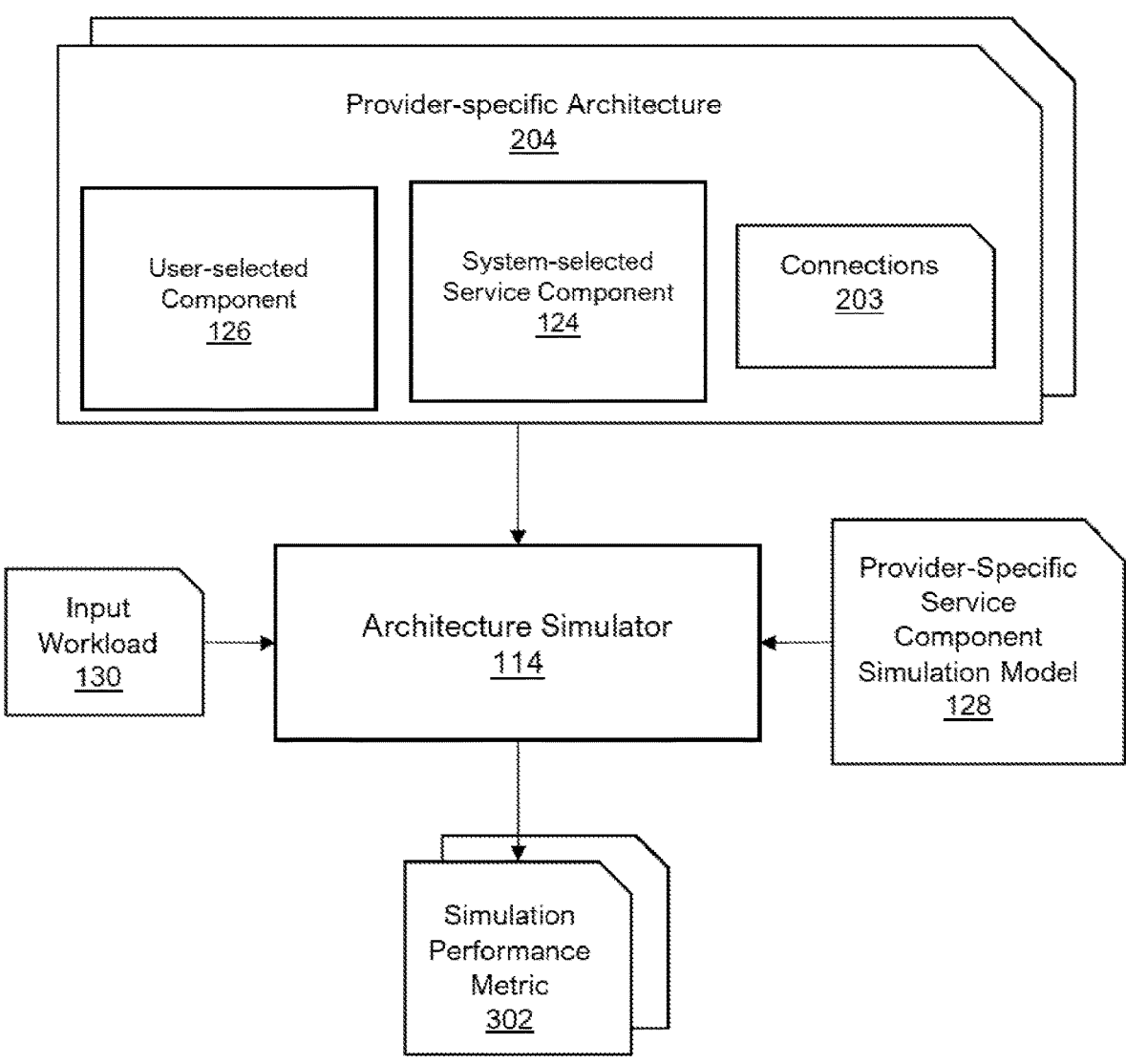
FIG. 3 illustrates a data flow diagram for an example of an architecture simulator in accordance with one or more embodiments.

FIG. 3 illustrates an example data flow diagram for the architecture simulator 114 in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

The architecture simulator 114 may receive one or more provider-specific architectures 204. The architectures 204 may be retrieved from the data repository 120 or may be passed directly to the architecture simulator 114 from the architecture generator 112.

The architecture simulator 114 may receive, or retrieve from the data repository 120, an input workload 130. The input workload 130 may include a set of operations for the provider-specific architectures 204 to execute. For example, the input workload 130 may include a set of database queries, a set of data to be operated on by one of the user-selected components 126, or combinations of data and instructions. The input workload 130 may include parameters such as a time limit for the simulation, a maximum number of events to process, and/or a rate of execution for the simulation. The input workload 130 may be static, where events are generated at a fixed rate. The input workload 130 may be dynamic, where the number of events generated varies with time.

For a given provider-specific architecture 204, the architecture simulator 114 may retrieve the provider-specific service component simulation models 128 associated with the respective system-selected service components 124 in the architecture 204. The architecture simulator 114 may construct, for example, a directed property graph data structure that includes each of the simulation models 128 and the connections 203. The architecture simulator 114 may also specify one or more service parameters that influence the observable cost and the runtime of the input workload 130. The architecture simulator 114 may also specify one or more model parameters that characterize how the simulation should be performed. As an example, a model parameter may specify a mean response time for performing a request.

In one or more embodiments, the architecture simulator 114 may simulate execution of the architecture at the request level. The architecture simulator 114 may use the simulation model to keep track of processing metrics including timing data such as an event arrival time, an event processing start time, and a processing completion. The architecture simulator 114 may also track communications metrics associated with communicating data between the respective provider-specific service components. The architecture simulator 114 may continue to simulate processing the input workload until all of the events in the input workload 130 have been processed, or until another simulation limit has been reached.

The architecture simulator 114 may aggregate timing data and communications metrics from the individual simulation models to generate and present one or more performance metrics 302 when the simulation is ended. A performance metric may include the total time, from a user's perspective, to execute the input workload across the architecture, referred to as a wall time. A performance metric may include a total time, from the cloud service's perspective to process the input workload, referred to as the total time. Timing information may be used to calculate cost information, for example, with a cost look-up table or a machine learning model. A performance metric may include a cost to complete processing the input workload. A performance metric may include an idle system cost, representing the cost of provisioning the provider-specific architecture while idle. A performance metric may include a workload cost, representing the cost to execute a specific workload on the provider-specific architecture. Other performance metrics may include, for example, a throughput, a mean wait time, and/or a total number of data units read.

One or more embodiments capture the time and cost of each event at each component of the architecture, which may allow for a greater variety and granularity of performance metrics to be presented to the user beyond just a total time or total cost estimate.

One or more embodiments may present the performance metrics 302 via the interface 102, for example, as a table, a chart, or other graphical representation of the performance metric for a simulation. When a plurality of simulations is performed, e.g., for a plurality of provider-specific architectures, presenting the performance metrics may include comparison indications, for example, highlighting the provider-specific architecture having the lowest cost, or the fastest total time. Alternatively, or in addition, the architecture simulator 114 may present an indication of which provider-specific architecture is recommended based on the performance metrics.

Some cloud architectures are static, meaning that once provisioned and deployed, the number and type of service components does not change. Other cloud architectures are dynamic, meaning that the number of resources may be scaled up or down based on factors such as a number of requests, amounts of data to be processed, and/or available network or compute resources. Accordingly, provider-specific service components may include, in their associated simulation models, parameters that allow the architecture simulator 114 to simulate processing on different dynamic configurations of the architecture.

5. Architecture Optimizer

Figure 4:
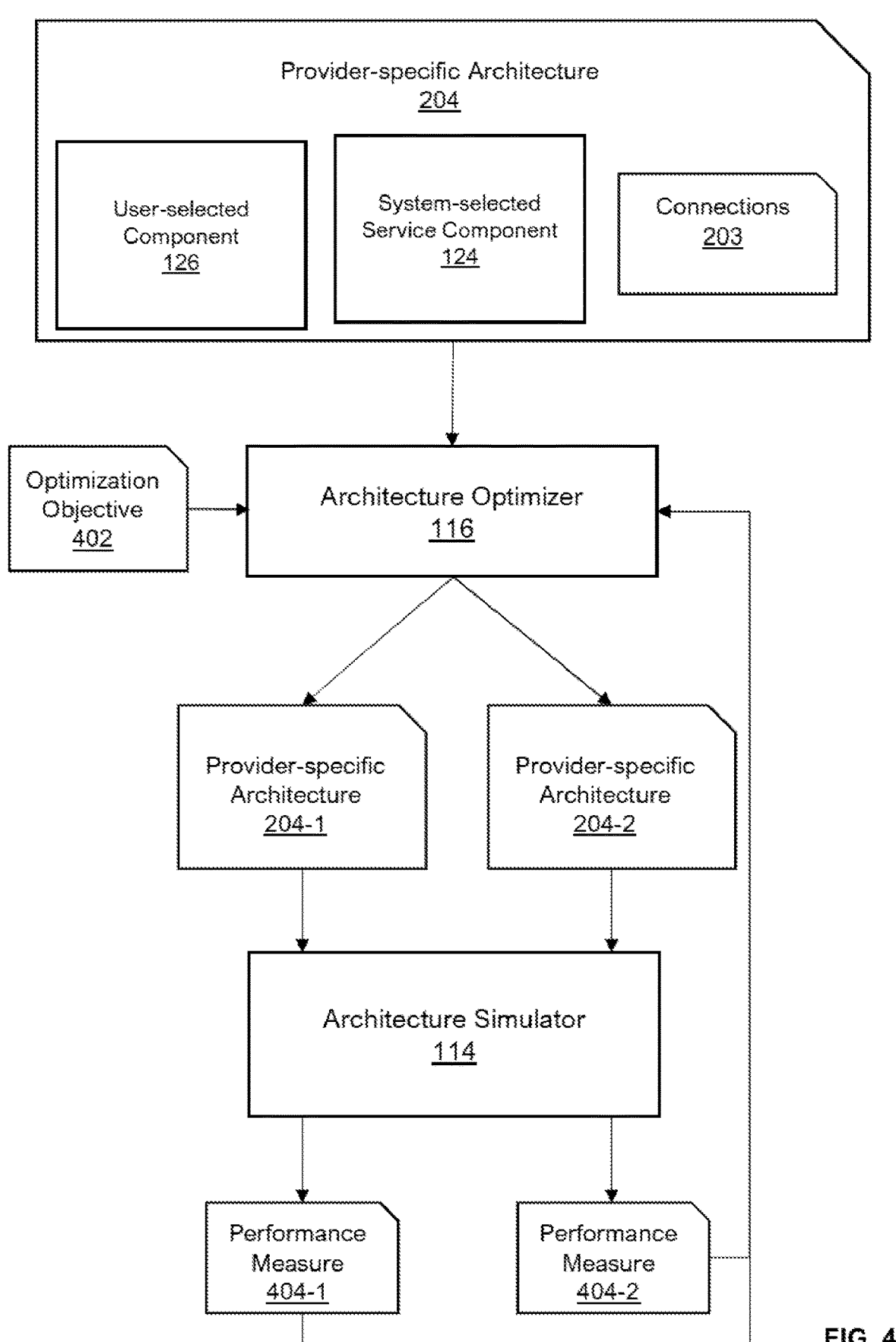
FIG. 4 illustrates a data flow diagram for an example of an architecture optimizer in accordance with one or more embodiments.

FIG. 4 illustrates an example data flow diagram for the architecture optimizer 116 in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

Some user-selected components 126 and some provider-specific service components 124 may include variants that provide the same functionality but that may be associated with different costs, timing, or other performance affecting attributes. For example, some provider-independent service descriptions 121 may include a plurality of design choices, such as different compute shapes for a service component. The set of options for a service component having design choices may be specified within the provider-specific architecture mapping 122 for the service component.

Some provider-specific service components 124 may include parameter choices. For example, for an APACHE SPARK batch processing component, the number of executors may be selected. The set of options for a parameter choice may be specified in the simulation model 128 for the service component.

The architecture optimizer 116 may vary the design choice and/or parameter choice for one or more components of a provider-specific architecture 204 to determine an "optimal" architecture with respect to an optimization objective 402. An optimization objective 402 may specify a condition on a simulation performance metric to meet or approach, such as, minimize cost, minimize total time, or maximize throughput. The term "optimal" may refer to an architecture that satisfies the optimization objective 402 or that comes closest, relative to other variants of the architecture, to satisfying the optimization objective 402.

Accordingly, the architecture optimizer 116 may receive a provider-specific architecture 204 and an optimization objective 402 and may vary one or more aspects of the provider-specific architecture 204 to produce a first variant 204-1 and a second variant 204-2. For example, the architecture optimizer 116 may associate a first parameter choice for a system-selected service component 124 with the first variant 204-1 and a second parameter choice for the system-selected service component 124 with the second variant 204-2. Alternatively, the architecture optimizer 116 may associate a first design choice for a system-selected service component 124 with the first variant 204-1 and a second design choice for the system-selected service component 124 with the second variant 204-2.

The variants may be simulated by the architecture simulator 114 as described above to generate a first performance measure 404-1 associated with the simulation of the first variant 204-1 and a second performance measure 404-2 associated with the simulation of the second variant 204-2.

The architecture optimizer 116 may evaluate the first and second performance measures and may recommend the variant corresponding to the performance measure that satisfies the optimization objective 402.

Although two variants are illustrated, the architecture optimizer 116 may produce more than two variants. The architecture optimizer 116 may vary more than one component at a time and/or may vary more than one aspect of a component at time, e.g., varying both a design choice and a parameter choice.

In some cases, the "optimal" architecture may not be practical for the user in other aspects. For example, the least-expensive architecture may not perform quickly enough, or an architecture that processes the data the fastest may require too many resources or be too expensive for the user. In those cases, one or more constraints may be used by the architecture optimizer 116 to produce a more practical architecture for the user's needs. For example, the architecture optimizer 116 may include constraints to minimize the total time to process the workload such that the cost of the workload is less than a specified amount.

6. Operations for Generating a Provider-Specific Architecture

Figure 5:
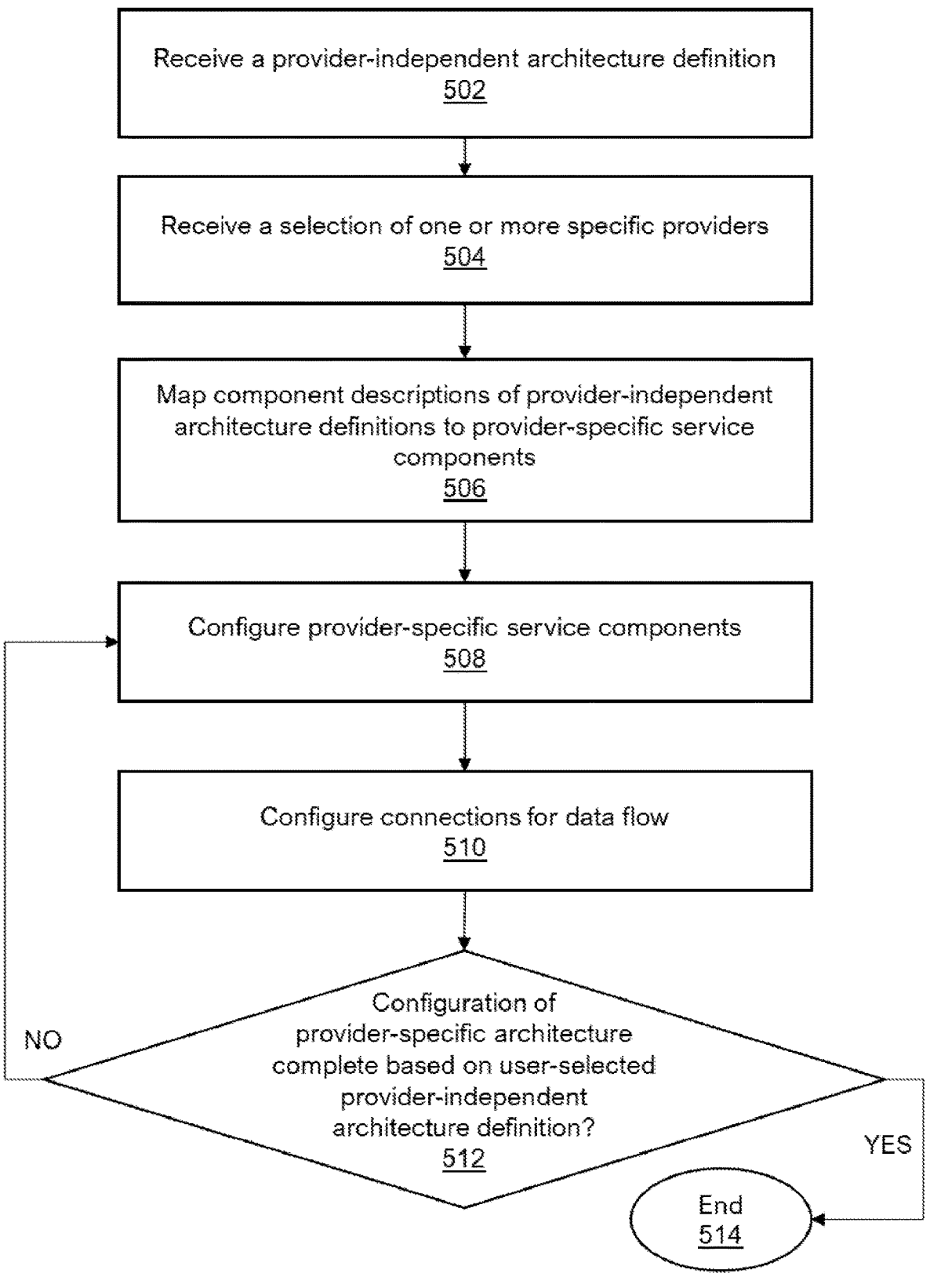
FIG. 5 illustrates an example set of operations for generating a provider-specific architecture in accordance with one or more embodiments.

FIGS. 5A-B illustrate an example set of operations for generating a provider-specific architecture, in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

One or more embodiments receive a provider-independent architecture definition (Operation 502). The architecture generator 112 may receive a provider-independent architecture definition from a user. The architecture generator 112 receives the definition, for example, via an interface. The user may select components via the interface, for example, from a menu, a file system, or a library data structure. The user may connect the components via the interface, for example, with a drawing operation that connects two components with a line. The user may connect the components, for example, by specifying, for each component, an input source and an output destination. The user may upload or otherwise select an existing partial or complete provider-independent architecture definition from a data repository.

One or more embodiments receive a selection of one or more specific cloud service providers (Operation 504). The architecture generator 112 may receive the selection from the user of each cloud service provider for which the user wishes to generate a provider-specific architecture. As an example, the architecture generator 112 may present a list of all available cloud service providers to the user via the interface, and may receive the user's selections from the list. The architecture generator 112 may determine a candidate set of cloud service providers based on the provider-independent architecture definition. As an example, the architecture generator 112 may identify cloud service providers that provide compute components that map to the component descriptions in the provider-independent architecture definition. The architecture generator 112 may present candidates to the user via the interface. The architecture generator 112 may then receive a user's selection via the interface.

One or more embodiments map, for a particular cloud service provider in the received selection, component descriptions of provider-independent architecture definitions to provider-specific service components (Operation 506). For example, if the provider-independent architecture is represented as a directed property graph of vertices corresponding to component descriptions and edges corresponding to connections, the architecture generator 112 may select the first vertex in the directed property graph. The architecture generator 112 may, on subsequent passes through the set of operations, select another vertex.

The architecture generator 112 may determine whether the component description corresponds to exactly one provider-specific component. As an example, the architecture generator 112 may use a look-up table that may include a plurality of entries for provider-independent component descriptions, where each entry is coupled to a provider-specific service component. The architecture generator 112 may use a decision tree that may include a logical flow of choices and consequences, where a choice may be a provider-independent architecture component and a consequence may be a provider-specific service component. A choice may also include parameters, such as a size, a number of processing resources, a programming language, or a data format.

A provider-independent architecture definition may map to zero, one, or more than one provider-specific service components. When the provider-independent architecture definition maps to exactly one provider-specific service component, the architecture generator 112 may select the exactly one provider-specific service component. As an example, the architecture generator 112 may store the selected provider-specific service component in the provider-specific architecture. The architecture generator 112 may carry over any connections associated with the selected provider-specific component in the provider-independent architecture definition.

In another example, the architecture generator 112 may store metadata associated with the selected provider-specific service component in a data structure representing the provider-specific architecture. Once all of the provider-independent architecture definitions are mapped, the architecture generator 112 may generate the provider-specific architecture from the stored metadata and the connections.

When the provider-independent architecture definition maps to more than one possible provider-specific service component, the architecture generator 112 may select one provider-specific component based on additional properties when the component description corresponds to more than one provider-specific component. The provider-specific architecture mapping for the selected cloud service provider may include logic to select from multiple service components based on one or more additional parameters. The architecture generator 112 may select one of possible service components based on a dependency between another provider-specific service component and the provider-specific service component currently being mapped. For example, one provider-specific service component may output data in a format that be input to one of the provider-specific service components but not to another.

The architecture generator 112 may select one of the possible service components based on real-time data associated with data traffic within the provider-specific architecture. For example, one possible service component may process data faster than another and may be more suitable for the expected data flow within the architecture.

The architecture generator 112 may select one of the plurality of service components based on the closest match in functionality between the selected one of the plurality of provider-specific service components and the functionality specified in the description. The architecture generator 112 may select one of the plurality of service components based on properties and/or operations of the user-selected component associated with the service description. As an example, if a user-selected component is an underlying database product in a first format, a first database service component for a managed relational database system may be selected, while a database product in a second format may cause a second, different, database service component to be selected for the same cloud service provider.

One or more embodiments may select a plurality of provider-specific service components to map to one provider-independent architecture definition to achieve the functionality specified by the provider-independent architecture definition. As an example, if additional processing power is needed, multiple virtual machine service components may be selected.

In some cases, if a provider-specific service component cannot be selected, the architecture generator 112 may present an error to the user (not shown). The architecture generator 112 may further suggest that additional properties may need to be added to the mapping, or that the provider-independent service description may be too broad and could be sub-divided. Additionally, or alternatively, the user may be prompted to select from the plurality of provider-specific service components manually.

When the provider-independent architecture definition maps to no provider-specific service components, the architecture generator 112 may select a user-provided alternative provider-specific component. The architecture generator 112 may prompt the user to create and/or register a new provider-independent service description as a placeholder for a non-existent provider-specific service component. In some cases, the architecture generator 112 may suggest a provider-specific service component that provides similar functionality if one exists. If there is no suitable functional equivalent available for a provider-specific service component, the architecture generator 112 may raise an error. One or more embodiments may configure the provider-specific service components (Operation 508). The architecture generator 112 may configure a provider-specific service component to perform certain operations related to the user-selected component associated with the provider-specific service component. The architecture generator 112 may configure a provider-specific service component to transmit certain datasets and/or results of operations to other provider-specific service components. The architecture generator 112 may configure a provider-specific service component to process data received from another component. For example, to apply a metadata classifier to an input data item and then store the classifier in a data store.

One or more embodiments may configure the connections for the data flow (Operation 510). The architecture generator 112 may, for example, examine metadata for a user-selected or system-selected component to determine data types for inputs and outputs of two connected components. The architecture generator 112 may configure a data flow between two connected components in the architecture based on data flow information associated with a connection between the two components. The architecture generator 112 may configure a data flow between two connected components based on an interface element associated with a receiving component. The architecture generator 112 may configure a data flow between two connected components based on a previously configured provider-specific architecture using the same system-selected component and a similar user-selected component.

One or more embodiments determine whether the configuration of components and dataflow for the provider-specific architecture is complete based on user-selected provider-independent architecture definition (Operation 512). The architecture generator 112 may check that each provider-independent service description has been mapped to a provider-specific service component. The architecture generator 112 may examine the provider-specific architecture to determine whether each component is being used in at least one of the dataflows. The architecture generator 112 may examine the provider-specific architecture to determine whether the output of each component is being used in at least one of the dataflows.

When the configuration for provider-specific architecture is complete, the architecture generator 112 ends the process (Operation 514). If not already stored, the architecture generator 112 may store the provider-specific architecture, for example in the data repository.

If the configuration for provider-specific architecture is not complete, the architecture generator 112 may return to operation 508 to configure any remaining components, and to operation 510 to configure any remaining connections.

7. Operations for Simulating a Provider-Specific Architecture

Figure 6:
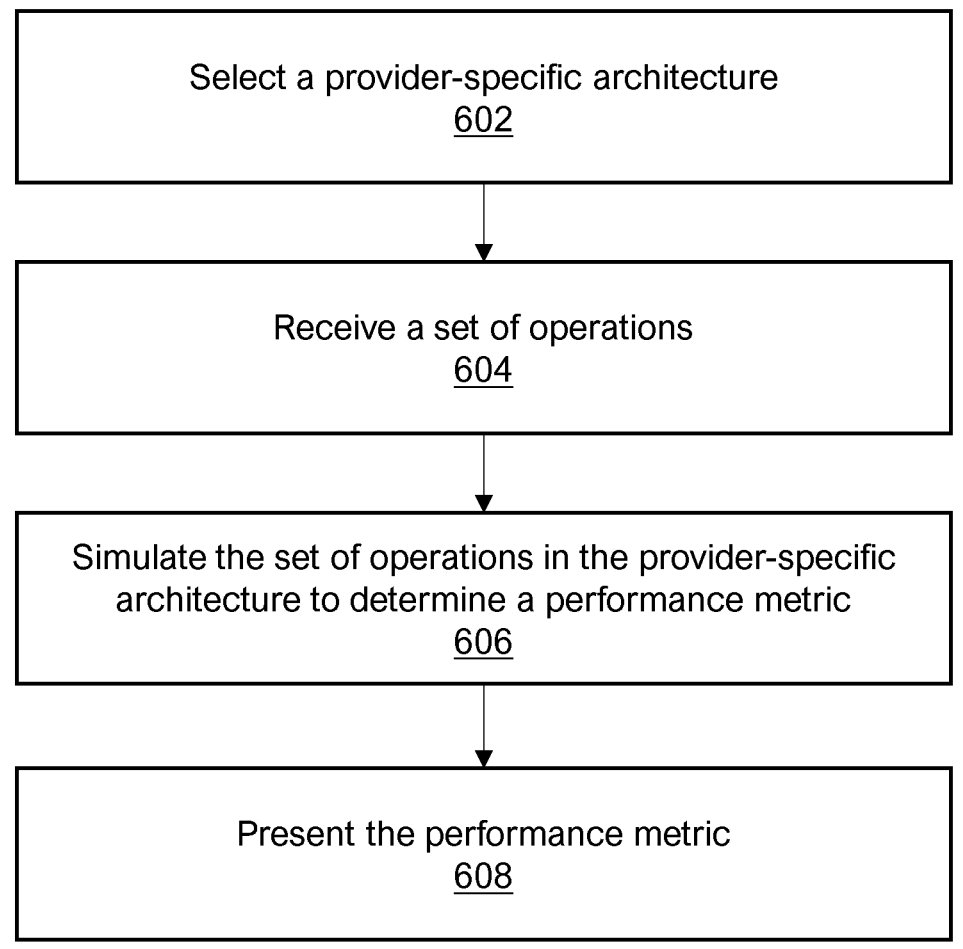
FIG. 6 illustrates an example set of operations for simulating a provider-specific architecture in accordance with one or more embodiments.

FIG. 6 illustrates an example set of operations for simulating a provider-specific architecture, in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

One or more embodiments select a provider-specific architecture for simulation (Operation 602). The architecture simulator 114 may receive a set of one or more provider-specific architectures from the architecture generator 112 directly, or via a user selection via the interface.

One or more embodiments receive a set of operations representing an input workload for the simulations (Operation 604). The architecture simulator 114 may prompt the user to select a set of operations that represent the type of data that the provider-specific architecture will operate on from the data repository. The architecture simulator 114 may suggest one or more sets of operations to the user for selection based on sets of operations that have been used for similar architecture components in the past.

One or more embodiments simulate the set of operations in the provider-specific architecture to determine a performance metric (Operation 606). For a given provider-specific architecture, the architecture simulator 114 may retrieve the provider-specific service component simulation models associated with the respective system-selected service components in the provider-specific architecture. The architecture simulator 114 may construct, for example, a directed property graph data structure that includes each of the simulation models and the connections defined in the architecture.

For example, the architecture simulator 114 may, at each vertex of the directed property graph data structure, simulate a creation of an event, the acceptance of the event by the service component of at that vertex; queueing of the event; processing of the event; and termination of the event. The architecture simulator 114 may, at the start of a simulation, initiate a priority data queue structure and associate a simulation clock time with the head of the priority queue. The simulation may begin with generating arrival events to the queue from the input workload. The earliest event may be dequeued and passed to the first simulation model in the directed property graph. As each simulation model receives an event, the simulation model may produce a follow-on event if the simulation model includes a procedure to do so. For example, if the event represents a database query, the simulation model for a database management service component may produce an event that represents the result of the query, which may be passed to the next node in the directed property graph data structure. The architecture simulator 114 may use the simulation model to keep track of processing metrics including timing data such as an event arrival time, an event processing start time, and a processing completion. The architecture simulator 114 may also track communications metrics associated with communicating data between the respective provider-specific service components. The architecture simulator 114 may continue to simulate processing the input workload until all of the events in the input workload 130 have been processed, or until another simulation limit has been reached.

The architecture simulator 114 may then pass the data in the set of operations to the simulation models as input events. The architecture simulator 114 may track the timing of the input events as they are passed to each simulation model until the entire set of operations has been processed, or until another simulation limit has been reached.

One or more embodiments present the performance metric (Operation 608). The architecture simulator 114 may present one or more performance metrics including the tracked timing information, an aggregation of the tracked timing information, a result of a calculation using the timing information, or any other information pertaining to the performance of the provider-specific architecture simulation models on the set of operations.

One or more embodiments may allow the user to select one or more of the provider-specific architectures for further operations such as optimization or deployment to the cloud-service provider. The architecture simulator 114 may recommend one of the provider-specific architectures for selection, for example, based on the performance metrics.

8. Operations for Optimizing a Provider-Specific Architecture

Figure 7:
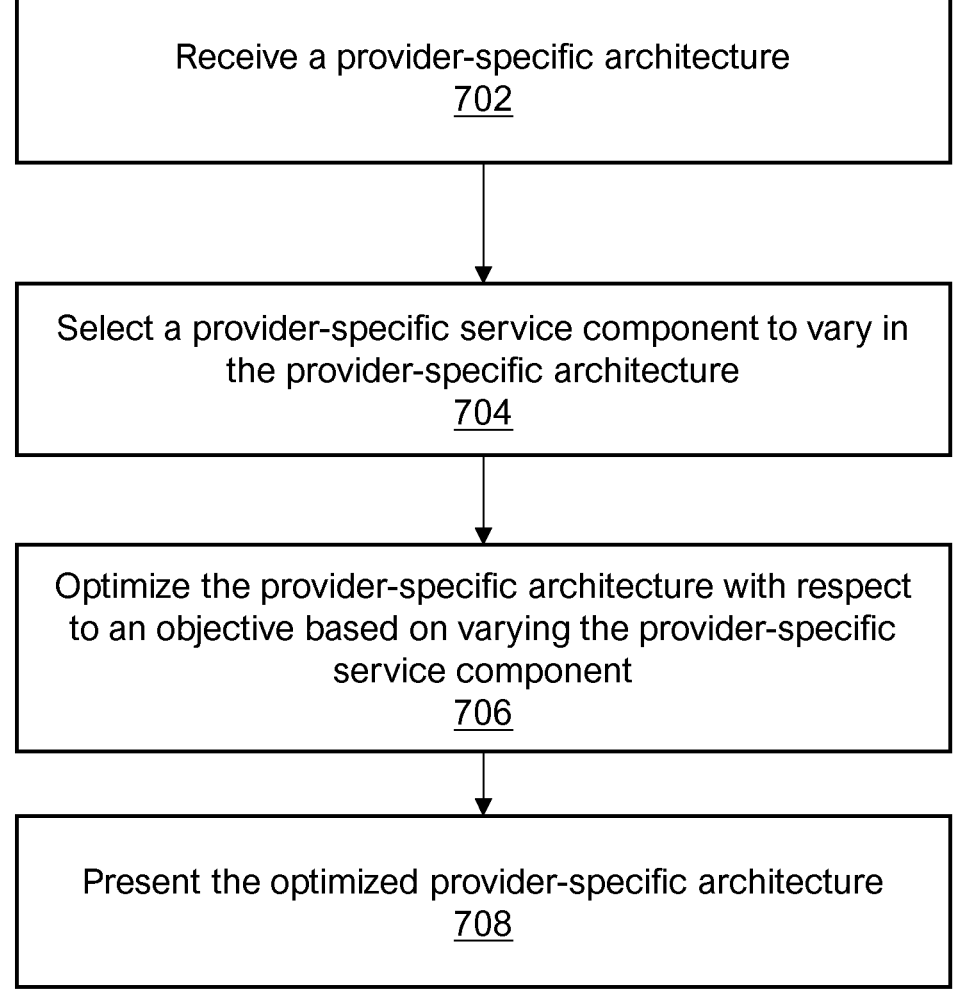
FIG. 7 illustrates an example set of operations for optimizing a provider-specific architecture in accordance with one or more embodiments.

FIG. 7 illustrates an example set of operations for optimizing a provider-specific architecture, in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments receive a provider-specific architecture (Operation 702). The architecture optimizer 116 may receive a provider-specific architecture from the architecture generator 112, from the architecture simulator 114, or via a user selection, for example, from a set of stored provider-specific architectures on the data repository.

One or more embodiments select a provider-specific service component to vary in the provider-specific architecture (Operation 704). In some cases, only one component within the provider-specific architecture may have variants. In other cases, the architecture optimizer 116 may prompt the user to select from a plurality of provider-specific service component to vary via the interface, and the user may specify which component(s) they wish to vary for optimization.

One or more embodiments optimize the provider-specific architecture with respect to an objective based on varying the provider-specific service component (Operation 706). When the variants for the selected provider-specific service component include design choices, the architecture optimizer 116 may create a separate variant of the selected provider-specific service component for each option, or for a subset of options, provided within the provider-specific architecture mapping for that component. When the variants for the selected provider-specific service component include parameter choices, the architecture optimizer 116 may create a separate variant of the selected provider-specific service component for each option, or for a subset of options, specified within the simulation model for that selected provider-specific service component.

The architecture optimizer 116 may provide the provider-specific architectures having the variants to the architecture simulator 114 for simulation. The architecture optimizer 116 may evaluate the performance metrics from the respective simulations against an optimization objective. In one or more embodiments, the architecture optimizer 116 may use the architecture simulator 114 in a Bayesian optimization process. The optimization process may be an unconstrained optimization, or a constrained optimization. In an unconstrained Bayesian optimization, the architecture optimizer 116 may, in a first pass, vary the design choices for a provider-specific service component. In a second pass, the architecture optimizer 116 may vary the version of the architecture having the optimal design choice with respect to the set of parameters in the simulation model. The architecture optimizer 116 may select the version of the provider-specific architecture that satisfies the optimization object as an optimized architecture.

One or more embodiments present the optimized provider-specific architecture (Operation 708). The architecture optimizer 116 may update the provider-specific architecture with the variant that produced the optimized version and may present the updated architecture to the user for selection and deployment to the cloud service provider.

9. Example Embodiments

A detailed example is described below for purposes of clarity. Components and/or operations described below should be understood as one specific example which may not be applicable to certain embodiments. Accordingly, components and/or operations described below should not be construed as limiting the scope of any of the claims.

Figure 8:
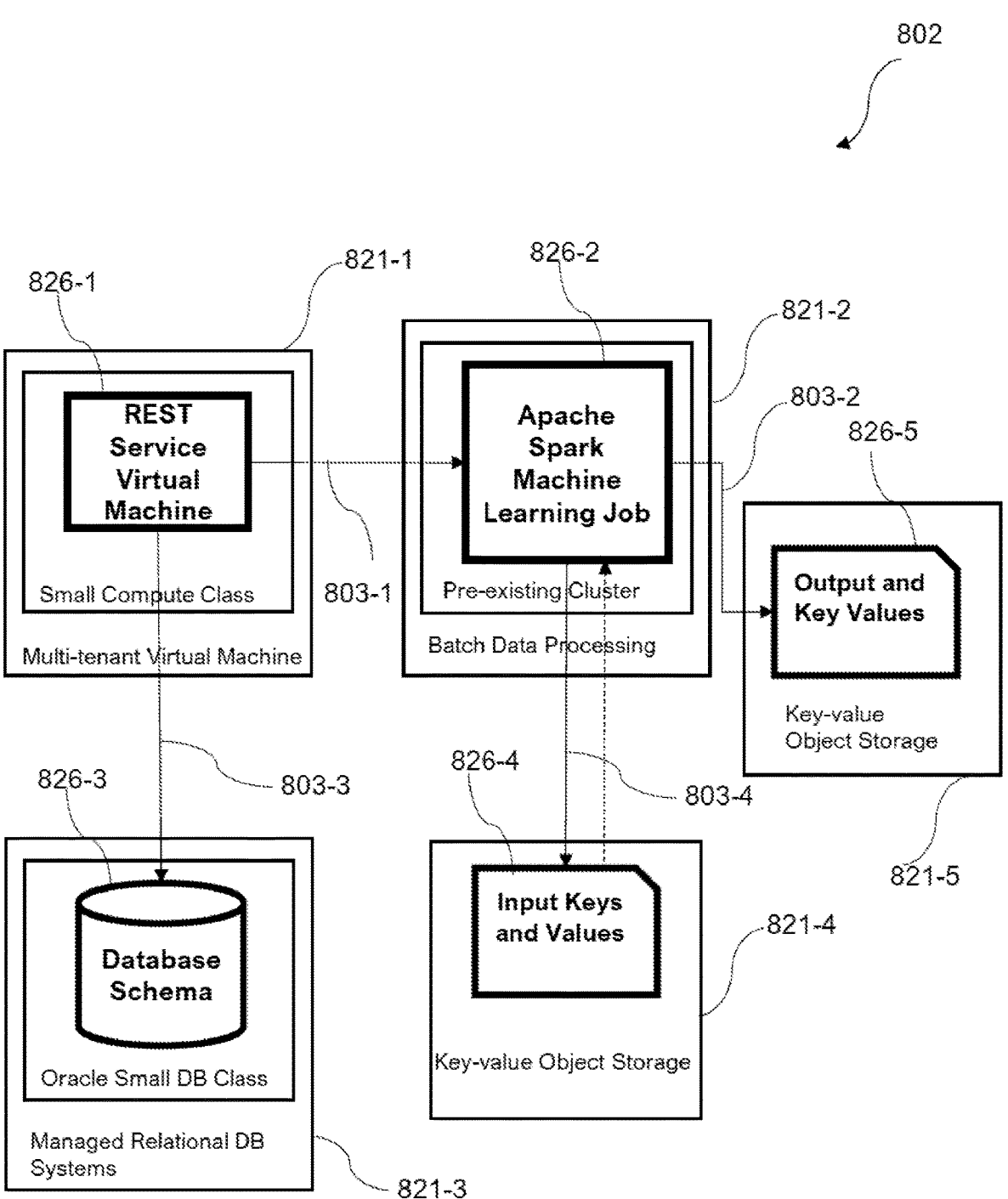
FIG. 8 illustrates an example of a provider-independent architecture definition.

FIG. 8 illustrates a graphical representation of a provider-independent architecture definition 802. The illustrated provider-independent architecture definition 802 describes a service that receives a batch data processing job that applies a machine learning classifier to each input data row and stores each corresponding classification output to storage.

The architecture definition 802 includes user-selected components 826-1, 826-2, 826-3, 826-4, and 826-5. The architecture definition 802 includes provider-independent service descriptions 821-1, 821-2, 821-3, 821-4, and 821-5. The architecture definition 802 includes connections 803-1, 803-2, 803-3, and 803-4.

The user-selected component 826-1 represents a REST service virtual machine, provided by the user, that receives requests to start a batch data processing job. The user-selected component 826-1 is associated with a provider-independent service description 821-1, which is a multi-tenant virtual machine having a small compute shape as a design choice.

The user-selected component 826-2 represents an APACHE SPARK machine learning job that receives an APACHE SPARK job submitted by the user-selected component 826-1 via the connection 803-1. The user-selected component 826-2 is associated with a provider-independent service description 821-2, which is a batch data processing service having a pre-existing cluster.

The user-selected component 826-3 represents a database into which the user-selected component 826-1 caches job metadata via the connection 803-3. The job metadata may include, for example, information that allows adjacent systems to query the architecture as to the status of a batch processing job. The user-selected component 826-3 is associated with a provider-independent service description 821-3, which is managed relational database (DB) system that uses an ORACLE small database class as a design choice.

The user-selected component 826-4 represents data for input keys and values. The user-selected component 826-2 requests and receives input values from the user-selected component 826-4 via the connection 803-4. The user-selected component 826-4 is associated with a key-value object storage 821-4, which is a data storage component.

The user-selected component 826-5 represents the output data from the user-selected component 826-2, e.g., a machine learning classifier applied to the input data. The user-selected component 826-2 writes the output values to the user-selected component 826-5 via the connection 803-2. The user-selected component 826-5 is associated with a key-value object storage 821-5, which is a data storage component.

In one or more embodiments, a provider-independent architecture definition may be saved, for example, to the data repository, for use as a template for subsequent architecture designs. A user could select the saved architecture definition, replace the user-selected components with others, modify one or more parameters or design choices, and proceed to generate one or more provider-specific architectures.

Figure 9:
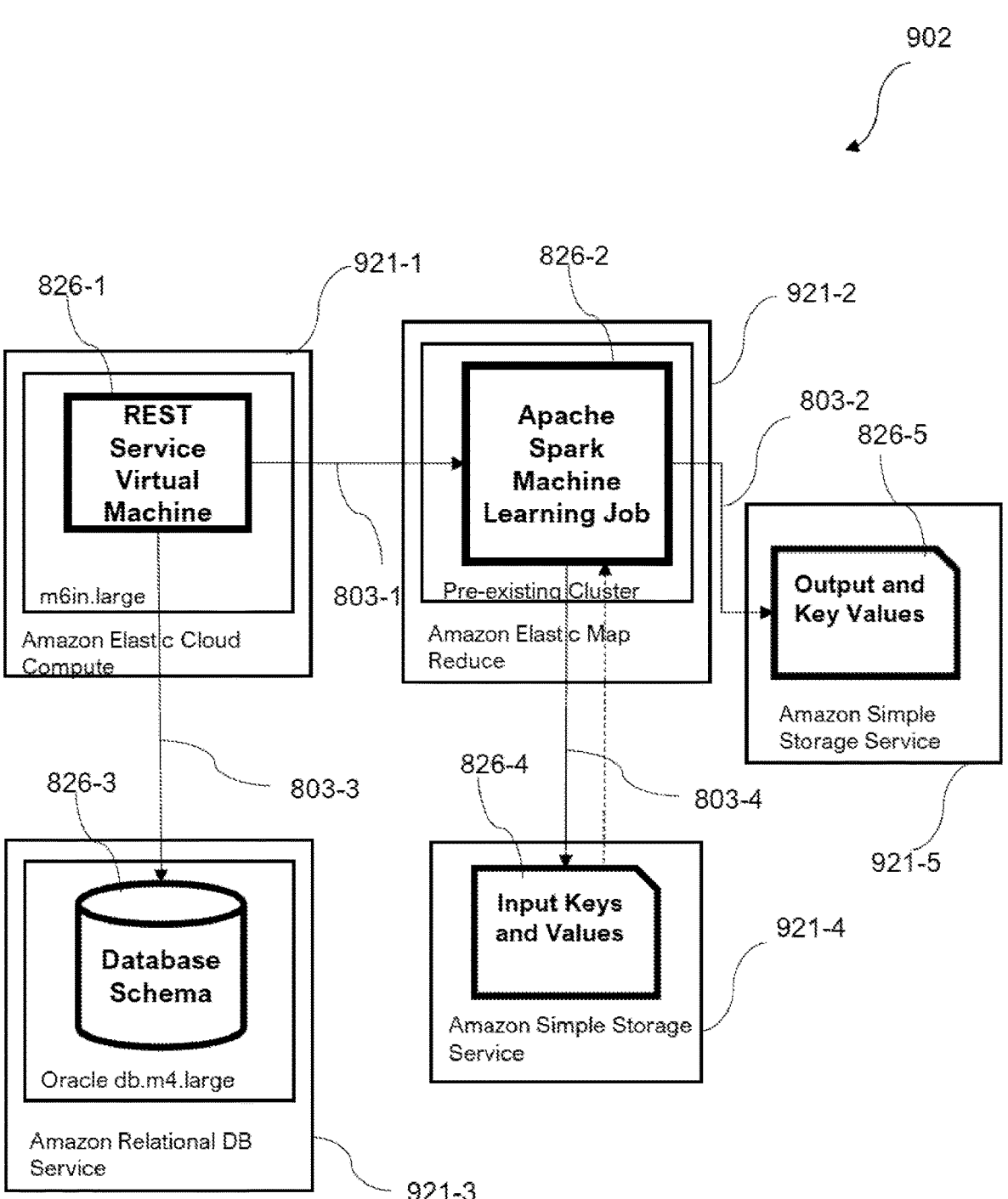
FIG. 9 illustrates a first example of a provider-specific architecture.

FIG. 9 illustrates a first example of a provider-specific architecture 902 that may be generated from the provider-independent architecture definition 802. In the illustrated example, the architecture 902 has been generated for the cloud service provider AMAZON WEB SERVICES (AWS). While the user-selected components 826 and the connections 803 may remain the same from the provider-independent to the provider-specific architectures, the provider-independent service descriptions 821-1, 821-2, 821-3, 821-4, and 821-5 have been replaced with system-selected components 921-1, 921-1, 921-3, 921-4, and 921-5, respectively.

As shown, the multi-tenant virtual machine having a small compute shape (821-1) has been mapped to the AWS AMAZON Elastic Cloud Compute with the corresponding compute shape of m6in.large (921-1). The batch data processing service having a pre-existing cluster (821-2) has been mapped to an AMAZON Elastic Map Reduce component (921-2). The managed relational database (DB) system that uses an ORACLE small database class (821-3) has been mapped to an AMAZON Relational DB Service component (921-3), using ORACLE db.m4.large as its small database class. The key-value object storage 821-4 and 821-5 have been mapped to AMAZON Simple Storage Service components 921-4 and 921-5, respectively.

Figure 10:
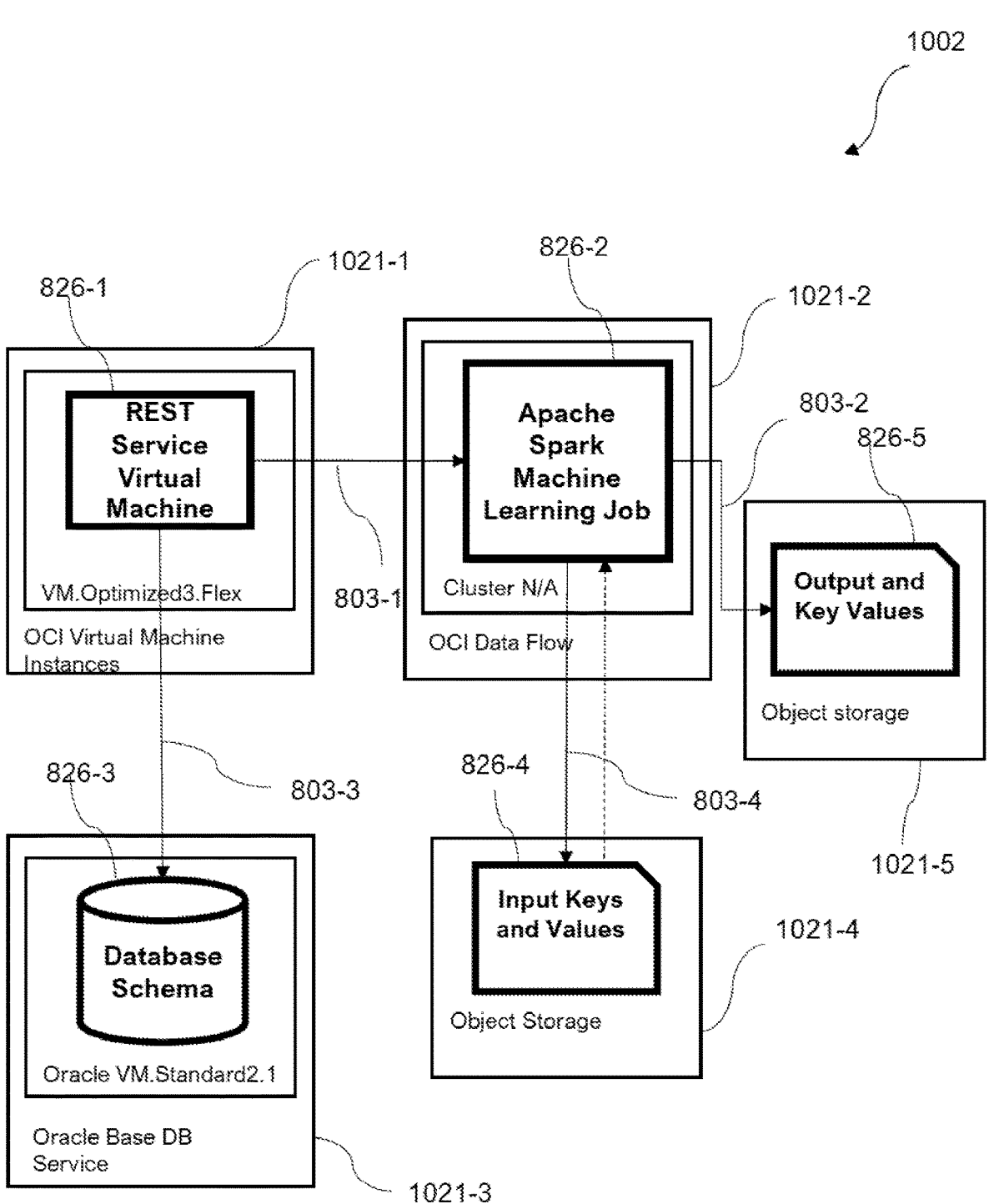
FIG. 10 illustrates a second example of a provider-specific architecture.

FIG. 10 illustrates a second example of a provider-specific architecture 1002 that may be generated from the provider-independent architecture definition 802. In the illustrated example, the architecture 1002 has been generated for the cloud service provider ORACLE CLOUD INFRASTRUCTURE (OCI). While the user-selected components 826 and the connections 803 may remain the same from the provider-independent to the provider-specific architectures, the provider-independent service descriptions 821-1, 821-2, 821-3, 821-4, and 821-5 have been replaced with system-selected components 1021-1, 1021-1, 1021-3, 1021-4, and 1021-5, respectively.

As shown, the multi-tenant virtual machine having a small compute shape (821-1) has been mapped to the OCI Virtual Machine Instances with the corresponding compute shape of VM.Optimized3.Flex (1021-1). The batch data processing service having a pre-existing cluster (821-2) has been mapped to an OCI Data Flow component (1021-2), which does not have a cluster specification. The managed relational database (DB) system that uses an ORACLE small database class (821-3) has been mapped to an ORACLE Base DB Service component (1021-3), using ORACLE VM.Standard2.1 as its small database class. The key-value object storage 821-4 and 821-5 have been mapped to ORACLE Object Storage components 1021-4 and 1021-5, respectively.

10. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

11. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 11:
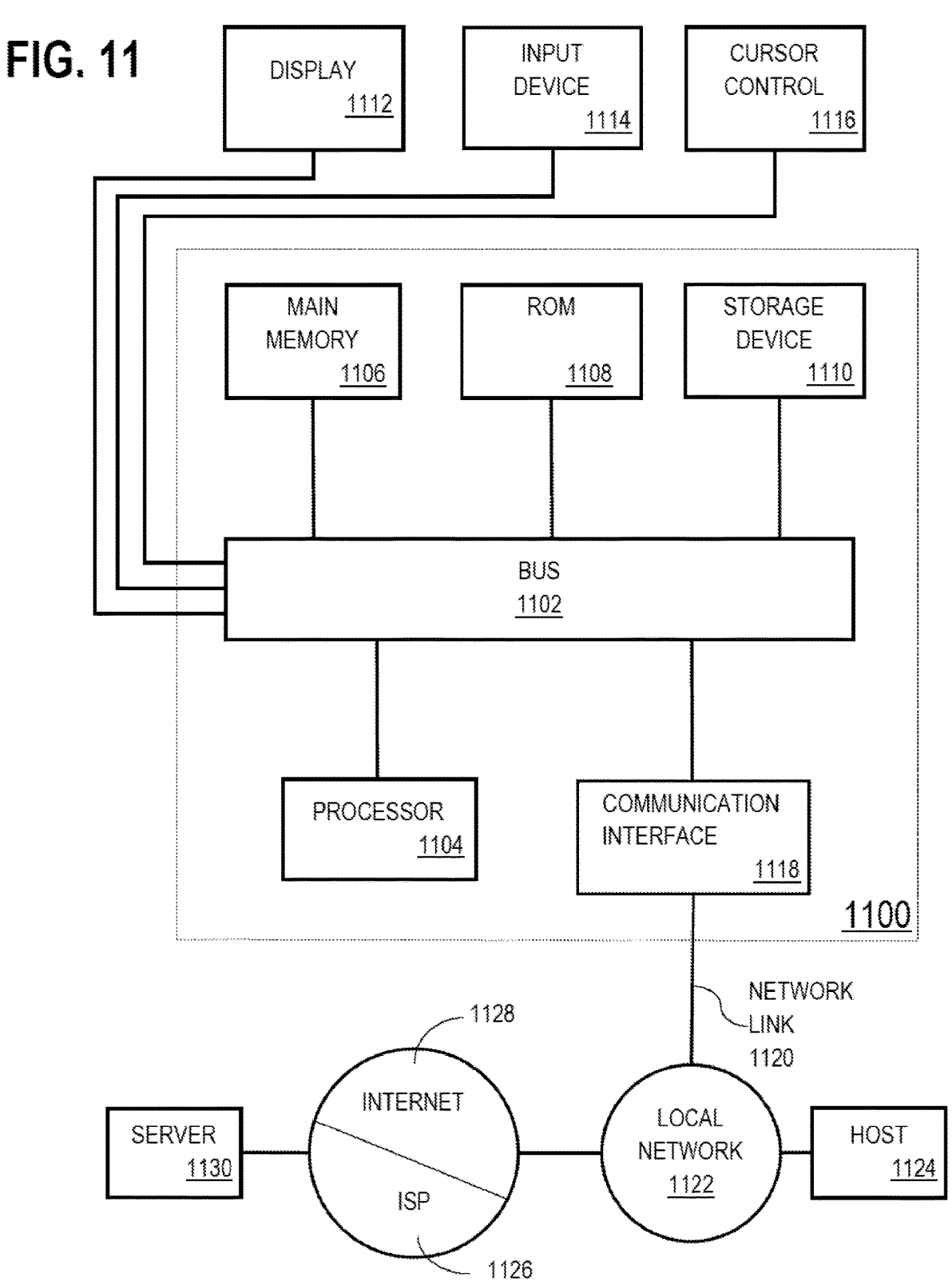
FIG. 11 shows a block diagram that illustrates a computer system in accordance with one or more embodiments.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general-purpose microprocessor.

Computer system 1100 also includes a main memory 1106, such as a random-access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

12. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media storing instructions which, when executed by one or more hardware processors, causes performance of operations comprising:

receiving a provider-independent architecture definition for a cloud-based system, wherein the provider-independent architecture definition defines:

a set of one or more user-selected components;

a set of one or more descriptions for service components that are to be selected based on provider-specific services for cloud-based systems; and a set of one or more connections representing one or more data flows among the set of one or more user-selected components and the service components;

generating a first provider-specific architecture, corresponding to a first cloud provider, based on the provider-independent architecture at least by:

incorporating the set of user-selected components in the first provider-specific architecture, wherein a first set of system-selected service components corresponding to the first cloud provider is based on a mapping of the set of one or more descriptions to a first set of provider-specific services corresponding to the first cloud provider, and wherein the first set of system-selected service components is represented by a first set of one or more simulation models; and configuring the one or more data flows based on the one or more connections;

receiving an input workload;

executing the first set of one or more simulation models representing the first set of system-selected service components on the input workload;

generating a second provider-specific architecture, corresponding to a second cloud provider, based on the provider-independent architecture at least by:

incorporating the set of user-selected components in the second provider-specific architecture, wherein a second set of system-selected service components corresponding to the second cloud provider is based on a mapping of the set of one or more descriptions to a second set of provider-specific services corresponding to the second cloud provider, and wherein the second set of system-selected service components is represented by a second set of one or more simulation model; and configuring the one or more data flows based on the one or more connections;

executing the second set of one or more simulation models representing the second set of system-selected service components on the input workload; and presenting information based on a first performance metric for the first provider-specific architecture and a second performance metric for the second provider-specific architecture;

wherein the first performance metric is based on processing the input workload by the first set of one or more simulation models, and wherein the second performance metric is based on processing the input workload by the second set of one or more simulation models.

2. The one or more non-transitory computer readable media of claim 1, wherein the mapping comprises:

an association between a first description from the set of one or more descriptions to a plurality of provider-specific service components; and a selected one of the plurality of provider-specific service components, wherein the selection is based on at least one of:

a dependency between another provider-specific service component in the provider-specific architecture and the selected one of the plurality of provider-specific service components;

real-time data associated with data traffic within the provider-specific architecture;

operations performed by a user-selected component; or an association between a functionality of the selected one of the plurality of provider-specific service components and a functionality specified in the description.

3. The one or more non-transitory computer readable media of claim 1, wherein configuring the one or more data flows comprises:

configuring a first dataflow between a first user-selected component and a first system-selected component based on at least one of:

data flow information associated with a connection between the first user-selected component and the first system-selected component;

an interface element associated with first user-selected component and the first system-selected component;

an association between a type of data output by one of the first user-selected component and the first system-selected component and a type of data received as input by another of first user-selected component and the first system-selected component; or a previously configured provider-specific architecture that uses the first system-selected component and a similar first user-selected component.

4. The one or more non-transitory computer readable media of claim 1, wherein:

the first performance metric is based on at least one of (a) one or more first processing metrics and (b) one or more first communication metrics, wherein:

the one or more first processing metrics are associated with processing the input workload by the first set of one or more simulation models; and the first one or more communication metrics are associated with communicating data between respective provider-specific service components in the first set of provider-specific service components during execution of the first set of one or more simulation models; and the second performance metric is based on at least one of (a) one or more second processing metrics and (b) one or more second communication metrics, wherein:

the second one or more processing metrics are associated with processing the input workload by the second set of one or more simulation models; and the second one or more communication metrics are associated with communicating data between respective provider-specific service components in the second set of provider-specific service components during execution of the second set of one or more simulation models.

5. The one or more non-transitory computer readable media of claim 1, wherein the first set of one or more simulation models or the second set of one or more simulation models comprises at least one of:

a procedure to estimate a time needed to execute an event by the provider-specific service component;

a procedure for producing a new follow-on event from a received event;

a procedure for estimating a cost of processing an event;

an adjustable parameter to influence an event cost; or an adjustable parameter to influence a completion time.

6. The one or more non-transitory computer readable media of claim 1, wherein:

the presented information comprises a recommendation of one of the first provider-specific architecture and the second provider-specific architecture based on the first performance metric and the second performance metric.

7. The one or more non-transitory computer readable media of claim 1, wherein the input workload comprises a first set of operations and wherein executing a simulation model comprises simulating, for an operation in the set of operations, at least one of:

a creation of an event;

an acceptance of an event by a service component;

a queueing of an event;

a processing of an event; or a termination of an event.

8. The one or more non-transitory computer readable media of claim 1, further comprising instructions which, when executed by the one or more hardware processors, causes performance of operations comprising:

receiving a selection of one of the first and second provider-specific architectures;

generating a first variant provider-specific architecture having a first variant of a provider-specific service component that has at least two variants;

executing a third set of one or more simulation models, representing the set of system-selected service components associated with the first variant provider-specific architecture, on the input workload;

generating a second variant provider-specific architecture having a second variant of the provider-specific service component;

executing a fourth set of one or more simulation models, representing the set of system-selected service components associated with the second variant provider-specific architecture, on the input workload; and presenting a selection of the first variant of the provider-specific service component or the second variant of the provider-specific service component for the selected provider-specific architecture based on (a) a first optimization metric, (b) a second optimization metric, and (c) an objective, wherein:

the first optimization metric is associated with processing the input workload on the third set of simulation models, the second optimization metric is associated with processing the input workload on the fourth set of simulation models, and the selected variant of the provider-specific service component is associated with the optimization metric that satisfies the objective.

9. The one or more non-transitory computer readable media of claim 8, wherein the first variant comprises a first provider-specific service component associated with a first description from the set of one or more descriptions in the provider-independent architecture definition and the second variant comprises a second provider-specific service component associated with the first description from the set of one or more descriptions in the provider-independent architecture definition.

10. The one or more non-transitory computer readable media of claim 8, wherein the first variant comprises a first set of parameters applied to a provider-specific service component and the second variant comprises a second set of parameters applied to the provider-specific service component.

11. The one or more non-transitory computer readable media of claim 8, further comprising optimizing the selected provider-specific architecture with respect to one or more constraints on the first optimization metric and the second optimization metric.

12. One or more non-transitory computer readable media storing instructions which, when executed by one or more hardware processors, causes performance of operations comprising:

receiving a provider-independent architecture definition for a cloud-based system, wherein the provider-independent architecture defines:

a set of one or more user-selected components;

a set of one or more descriptions for service components that are to be selected based on provider-specific services for cloud-based systems; and a set of one or more connections representing one or more data flows among the set of one or more user-selected components and the set of one or more descriptions for service components;

generating a first version of a provider-specific architecture, corresponding to a first cloud provider, based on the provider-independent architecture at least by:

incorporating the set of user-selected components in the first version of the provider-specific architecture, wherein a first set of system-selected service components corresponding to the first cloud provider is based on a mapping of the set of one or more descriptions to a first set of provider-specific services corresponding to the first cloud provider, and wherein the first set of system-selected service components includes a first variant of a particular system-selected service component; and configuring the one or more data flows based on the one or more connections in the first version of the provider-specific architecture;

generating a second version of a provider-specific architecture, corresponding to the first cloud provider, based on the provider-independent architecture at least by:

incorporating the set of user-selected components in the second version of the provider-specific architecture, wherein the second set of system-selected service components corresponding to the first cloud provider is based on a mapping of the set of one or more descriptions to the first set of provider-specific services corresponding to the first cloud provider, and wherein the second set of system-selected service components includes a second variant of a particular system-selected service component; and configuring the one or more data flows based on the one or more connections in the second version of the provider-specific architecture; and optimizing the first-provider-specific architecture with respect to at least one objective;

receiving an input workload;

executing a first subset of one or more simulation models, representing the first set of system-selected service components, on the input workload;

executing a second subset of one or more simulation models, representing the second set of system-selected service components, on the input workload;

presenting a selection of the first variant of the provider-specific service component or the second variant of the provider-specific service component based on (a) a first optimization metric and (b) a second optimization metric, wherein:

the first optimization metric is associated with processing the input workload on the first set of simulation models, the second optimization metric is associated with processing the input workload on the second set of simulation models, and the selected variant of the provider-specific service component is associated with the optimization metric that satisfies the at least one objective.

13. The one or more non-transitory computer readable media of claim 12, further comprising:

generating the first optimization metric based on a first set of one or more performance metrics, wherein the first set of one or more performance metrics are based on processing the input workload by the first set of one or more simulation models;

generating the second optimization metric based on a second set of one or more performance metrics, wherein the second set of one or more performance metrics are based on processing the input workload by the second set of one or more simulation models; and presenting a recommendation of one of the first version of the provider-specific architecture or the second version of the provider-specific architecture having the optimization metric that satisfies the objective.

14. The one or more non-transitory computer readable media of claim 13, further comprising instructions which, when executed by the one or more hardware processors, causes performance of operations comprising:

generating a second provider-specific architecture, corresponding to a second cloud provider, based on the provider-independent architecture at least by:

incorporating the set of user-selected components in the second provider-specific architecture, wherein a second set of system-selected service components corresponding to the second cloud provider is based on a mapping of the set of one or more descriptions to a second set of provider-specific services corresponding to the second cloud provider, and wherein the second set of system-selected service components is represented by a third set of one or more simulation models; and configuring the one or more data flows based on the one or more connections;

executing the third set of one or more simulation models representing the second set of system-selected service components on the input workload; and presenting information based on the first set of one or more performance metrics for the first provider-specific architecture and a second performance metric for the second provider-specific architecture, wherein the second performance metric is based on processing the input workload by the third set of one or more simulation models.

15. The one or more non-transitory computer readable media of claim 12, wherein generating a version of the provider-specific architecture further comprises:

modifying the system-selected service component using a parameter value from a set of parameters in the one or more simulation models representing the system-selected service component as a variant; and including the modified system-selected service component in the first version of the provider-specific architecture.

16. The one or more non-transitory computer readable media of claim 12, wherein:

the first variant of the system-selected service component comprises a first design choice of a set of design choices in an associated provider-specific mapping for the system-selected service component; and the second variant of the system-selected service component comprises a second design choice.

17. The one or more non-transitory computer readable media of claim 12, further comprising:

executing a third subset of one or more simulation models, representing a third set of system-selected service components that includes a third variant of the particular system-select service component, on the input workload;

executing a fourth subset of one or more simulation models, representing a fourth set of system-selected service components that includes a fourth variant of the particular system-select service component, on the input workload; and presenting a selection of a version of the provider-specific architecture corresponding to the first, second, third, or fourth variant of the particular system-select service component based on (a) the first optimization metric, (b) the second optimization metric, (c) a third optimization metric, and (d) a fourth optimization metric, wherein:

the third optimization metric is associated with processing the input workload on the third set of simulation models, and the fourth optimization metric is associated with processing the input workload on the fourth set of simulation models, and the selected variant of the provider-specific service component is associated with the optimization metric that satisfies the at least one objective.

18. The one or more non-transitory computer readable media of claim 17, wherein the first variant and the second variant correspond to a first design choice and a second design choice for the particular system-selected service component, and wherein the third variant and the fourth variant correspond to a first parameter selection and a second parameter selection for the particular system-selected service component.

19. A system comprising:

one or more hardware processors;

one or more non-transitory computer-readable media; and program instructions stored on the one or more non-transitory computer-readable media which, when executed by one or more hardware processors, cause the system to perform operations comprising:

receiving a provider-independent architecture definition for a cloud-based system, wherein the provider-independent architecture defines:

a set of one or more user-selected components;

a set of one or more descriptions for service components that are to be selected based on provider-specific services for cloud-based systems; and a set of one or more connections representing one or more data flows among the set of one or more user-selected components and the set of one or more service components;

generating a first provider-specific architecture, corresponding to a first cloud provider, based on the provider-independent architecture at least by:

incorporating the set of user-selected components in the first provider-specific architecture, wherein a first set of system-selected service components corresponding to the first cloud provider is based on a mapping of the set of one or more descriptions to a first set of provider-specific services corresponding to the first cloud provider, and wherein the first set of system-selected service components is represented by a first set of one or more simulation models; and configuring the one or more data flows based on the one or more connections;

receiving an input workload;

executing the first set of one or more simulation models representing the first set of system-selected service components on the input workload;

generating a second provider-specific architecture, corresponding to a second cloud provider, based on the provider-independent architecture at least by:

incorporating the set of user-selected components in the second provider-specific architecture, wherein a second set of provider-specific services corresponding to the second cloud provider is based on a mapping of the set of one or more descriptions to a second set of provider-specific services corresponding to the second cloud provider, and wherein the second set of system-selected service components is represented by a second set of one or more simulation models; and configuring the one or more data flows based on the one or more connections;

executing the second set of one or more simulation models representing the second set of system-selected service components on the input workload; and presenting information based on a first performance metric for the first provider-specific architecture and a second performance metric for the second provider-specific architecture;

wherein the first performance metric is based on processing the input workload by the first set of one or more simulation models, and wherein the second performance metric is based on processing the input workload by the second set of one or more simulation models.

20. A method executed by at least one device including a hardware processor comprising:

receiving a provider-independent architecture definition for a cloud-based system, wherein the provider-independent architecture defines:

a set of one or more user-selected components;

a set of one or more descriptions for service components that are to be selected based on provider-specific services for cloud-based systems; and a set of one or more connections representing one or more data flows among the set of one or more user-selected components and the set of one or more service components;

generating a first provider-specific architecture, corresponding to a first cloud provider, based on the provider-independent architecture at least by:

incorporating the set of user-selected components in the first provider-specific architecture, wherein a first set of system-selected service components corresponding to the first cloud provider is based on a mapping of the set of one or more descriptions to a first set of provider-specific services corresponding to the first cloud provider, and wherein the first set of system-selected service components is represented by a first set of one or more simulation models; and configuring the one or more data flows based on the one or more connections;

receiving an input workload;

executing the first set of one or more simulation models representing the first set of system-selected service components on the input workload;

generating a second provider-specific architecture, corresponding to a second cloud provider, based on the provider-independent architecture at least by:

incorporating the set of user-selected components in the second provider-specific architecture, wherein a second set of provider-specific services corresponding to the second cloud provider is based on a mapping of the set of one or more descriptions to a second set of provider-specific services corresponding to the second cloud provider, and wherein the second set of system-selected service components is represented by a second set of one or more simulation models; and configuring the one or more data flows based on the one or more connections;

executing the second set of one or more simulation models representing the second set of system-selected service components on the input workload; and presenting information based on a first performance metric for the first provider-specific architecture and a second performance metric for the second provider-specific architecture;

wherein the first performance metric is based on processing the input workload by the first set of one or more simulation models, and wherein the second performance metric is based on processing the input workload by the second set of one or more simulation models.

21. The method of claim 20, wherein the mapping comprises:

an association between a first description from the set of one or more descriptions to a plurality of provider-specific service components; and a selected one of the plurality of provider-specific service components, wherein the selection is based on at least one of:

a dependency between another provider-specific service component in the provider-specific architecture and the selected one of the plurality of provider-specific service components;

real-time data associated with data traffic within the provider-specific architecture;

operations performed by a user-selected component; or an association between a functionality of the selected one of the plurality of provider-specific service components and a functionality specified in the description.

22. The method of claim 20, wherein configuring the one or more data flows comprises:

configuring a first dataflow between a first user-selected component and a first system-selected component based on at least one of:

data flow information associated with a connection between the first user-selected component and the first system-selected component;

an interface element associated with first user-selected component and the first system-selected component;

an association between a type of data output by one of the first user-selected component and the first system-selected component and a type of data received as input by another of first user-selected component and the first system-selected component; or a previously configured provider-specific architecture that uses the first system-selected component and a similar first user-selected component.

23. The method of claim 20, wherein:

the first performance metric is based on at least one of (a) one or more first processing metrics and (b) one or more first communication metrics, wherein:

the one or more first processing metrics are associated with processing the input workload by the first set of one or more simulation models; and the first one or more communication metrics are associated with communicating data between respective provider-specific service components in the first set of provider-specific service components during execution of the first set of one or more simulation models; and the second performance metric is based on at least one of (a) one or more second processing metrics and (b) one or more second communication metrics, wherein:

the second one or more processing metrics are associated with processing the input workload by the second set of one or more simulation models; and the second one or more communication metrics are associated with communicating data between respective provider-specific service components in the second set of provider-specific service components during execution of the second set of one or more simulation models.

24. The method of claim 20, wherein the first set of one or more simulation models or the second set of one or more simulation models comprises at least one of:

a procedure to estimate a time needed to execute an event by the provider-specific service component;

a procedure for producing a new follow-on event from a received event;

a procedure for estimating a cost of processing an event;

an adjustable parameter to influence an event cost; or an adjustable parameter to influence a completion time.

25. The method of claim 20, wherein: presented information comprises a recommendation of one of the first provider-specific architecture and the second provider-specific architecture based on the first performance metric and the second performance metric.

26. The method of claim 20, wherein the input workload comprises a first set of operations and wherein executing a simulation model comprises simulating, for an operation in the set of operations, at least one of:

a creation of an event;

an acceptance of an event by a service component;

a queueing of an event;

a processing of an event; or a termination of an event.

27. The method of claim 20, further comprising:

receiving a selection of one of the first and second provider-specific architectures;

generating a first variant provider-specific architecture having a first variant of a provider-specific service component that has at least two variants;

executing a third set of one or more simulation models, representing the set of system-selected service components associated with the first variant provider-specific architecture, on the input workload;

generating a second variant provider-specific architecture having a second variant of the provider-specific service component;

executing a fourth set of one or more simulation models, representing the set of system-selected service components associated with the second variant provider-specific architecture, on the input workload; and presenting a selection of the first variant of the provider-specific service component or the second variant of the provider-specific service component for the selected provider-specific architecture based on (a) a first optimization metric, (b) a second optimization metric, and (c) an objective, wherein:

the first optimization metric is associated with processing the input workload on the third set of simulation models, the second optimization metric is associated with processing the input workload on the fourth set of simulation models, and the selected variant of the provider-specific service component is associated with the optimization metric that satisfies the objective.

28. The method of claim 27, wherein the first variant comprises a first provider-specific service component associated with a first description from the set of one or more descriptions in the provider-independent architecture definition and the second variant comprises a second provider-specific service component that maps to the first description from the set of one or more descriptions in the provider-independent architecture definition.

29. The method of claim 27, wherein the first variant comprises a first set of parameters applied to a provider-specific service component and the second variant comprises a second set of parameters applied to the provider-specific service component.

30. The method of claim 27, further comprising optimizing the selected provider-specific architecture with respect to one or more constraints on the first optimization metric and the second optimization metric.

31. A method executed by at least one device including a hardware processor comprising:

receiving a provider-independent architecture definition for a cloud-based system, wherein the provider-independent architecture defines:

a set of one or more user-selected components;

a set of one or more descriptions for service components that are to be selected based on provider-specific services for cloud-based systems; and a set of one or more connections representing one or more data flows among the set of one or more user-selected components and the set of one or more descriptions for service components;

generating a first version of a provider-specific architecture, corresponding to a first cloud provider, based on the provider-independent architecture, wherein a first set of system-selected service components corresponding to the first cloud provider is based on a mapping of the set of one or more descriptions to a first set of provider-specific services corresponding to the first cloud provider, and wherein the first set of system-selected service components includes a first variant of a particular system-selected service component; and generating a second version of a provider-specific architecture, corresponding to the first cloud provider, based on the provider-independent architecture at least by:

incorporating the set of user-selected components in the second version of the provider-specific architecture, wherein the second set of system-selected service components corresponding to the first cloud provider is based on a mapping of the set of one or more descriptions to the first set of provider-specific services corresponding to the first cloud provider, and wherein the second set of system-selected service components includes a second variant of a particular system-selected service component; and configuring the one or more data flows based on the one or more connections in the second version of the provider-specific architecture; and optimizing the provider-specific architecture with respect to at least one objective;

receiving an input workload;

executing a first subset of one or more simulation models, representing the first set of system-selected service components, on the input workload;

executing a second subset of one or more simulation models, representing the second set of system-selected service components, on the input workload; and presenting a selection of the first variant of the provider-specific service component or the second variant of the provider-specific service component based on (a) a first optimization metric and (b) a second optimization metric, wherein:

the first optimization metric is associated with processing the input workload on the first set of simulation models, the second optimization metric is associated with processing the input workload on the second set of simulation models, and the selected variant of the provider-specific service component is associated with the optimization metric that satisfies the at least one objective.

32. The method of claim 31, further comprising:

generating the first optimization metric based on a first set of one or more performance metrics, wherein the first set of one or more performance metrics are based on processing the input workload by the first set of one or more simulation models;

generating the second optimization metric based on a second set of one or more performance metrics, wherein the second set of one or more performance metrics are based on processing the input workload by the second set of one or more simulation models; and presenting a recommendation of one of the first version of the first provider-specific architecture or the second version of the provider-specific architecture having the optimization metric that satisfies the objective.

33. The method of claim 31, wherein generating a version of the provider-specific architecture further comprises:

modifying the system-selected service component using a parameter value from a set of parameters in the one or more simulation models representing the system-selected service component as a variant; and including the modified system-selected service component in the first version of the provider-specific architecture.

34. The method of claim 31, wherein:

the first variant of the system-selected service component comprises a first design choice of a set of design choices in an associated provider-specific mapping for the system-selected service component; and the second variant of the system-selected service component comprises a second design choice of the set of design choices.

35. The method of claim 31, further comprising:

executing a third subset of one or more simulation models, representing a third set of system-selected service components that includes a third variant of the particular system-select service component, on the input workload;

executing a fourth subset of one or more simulation models, representing a fourth set of system-selected service components that includes a fourth variant of the particular system-select service component, on the input workload; and presenting a selection of a version of the provider-specific architecture corresponding to one of the first, second, third, or fourth variant of the particular system-select service component based on (a) the first optimization metric, (b) the second optimization metric, (c) a third optimization metric, and (d) a fourth optimization metric, wherein:

the third optimization metric is associated with processing the input workload on the third set of simulation models, the fourth optimization metric is associated with processing the input workload on the fourth set of simulation models, and the selected variant of the provider-specific service component is associated with the optimization metric that satisfies the at least one objective.

36. The method of claim 35, wherein the first variant and the second variant correspond to a first design choice and a second design choice for the particular system-selected service component, and wherein the third variant and the fourth variant correspond to a first parameter selection and a second parameter selection for the particular system-selected service component.

37. The method of claim 31, further comprising instructions which, when executed by the one or more hardware processors, causes performance of operations comprising:

generating a second provider-specific architecture, corresponding to a second cloud provider, based on the provider-independent architecture at least by:

incorporating the set of user-selected components in the second provider-specific architecture, wherein a second set of system-selected service components corresponding to the second cloud provider is based on a mapping of the set of one or more descriptions to a second set of provider-specific services corresponding to the second cloud provider, and wherein the second set of system-selected service components is represented by a third set of one or more simulation models to obtain a second set of system selected components corresponding to the second cloud provider; and configuring the one or more data flows based on the one or more connections;

executing the third set of one or more simulation models representing the second set of system-selected service components on the input workload;

presenting at least one second performance metric based on at least one of (a) one or more second processing metrics and (b) one or more second communication metrics, wherein:

the second one or more processing metrics are associated with processing the input workload by the second set of one or more simulation models; and the second one or more communication metrics are associated with communicating data between respective provider-specific service components in the second set of provider-specific service components during execution of the second set of one or more simulation models; and presenting information based on the first performance metric for the first provider-specific architecture and the second performance metric for the second provider-specific architecture.

38. A system comprising:

one or more hardware processors;

one or more non-transitory computer-readable media; and program instructions stored on the one or more non-transitory computer-readable media which, when executed by one or more hardware processors, cause the system to perform operations comprising:

receiving a provider-independent architecture definition for a cloud-based system, wherein the provider-independent architecture defines:

a set of one or more user-selected components;

a set of one or more descriptions for service components that are to be selected based on provider-specific services for cloud-based systems; and a set of one or more connections representing one or more data flows among the set of one or more user-selected components and the set of one or more descriptions for service components;

generating a first version of a provider-specific architecture, corresponding to a first cloud provider, based on the provider-independent architecture at least by:

incorporating the set of user-selected components in the first version of the provider-specific architecture, wherein a first set of system-selected service components corresponding to the first cloud provider is based on a mapping of the set of one or more descriptions to a first set of provider-specific services corresponding to the first cloud provider, and wherein the first set of system-selected service components includes a first variant of a particular system-selected service component; and configuring the one or more data flows based on the one or more connections in the first version of the provider-specific architecture;

generating a second version of a provider-specific architecture, corresponding to the first cloud provider, based on the provider-independent architecture at least by:

incorporating the set of user-selected components in the second version of the provider-specific architecture, wherein the second set of system-selected service components corresponding to the first cloud provider is based on a mapping of the set of one or more descriptions to the first set of provider-specific services corresponding to the first cloud provider, and wherein the second set of system-selected service components includes a second variant of a particular system-selected service component; and configuring the one or more data flows based on the one or more connections in the second version of the provider-specific architecture; and optimizing the first provider-specific architecture with respect to at least one objective;

receiving an input workload;

executing a first subset of one or more simulation models, representing the first set of system-selected service components, on the input workload;

executing a second subset of one or more simulation models, representing the second set of system-selected service components, on the input workload; and presenting a selection of the first variant of the provider-specific service component or the second variant of the provider-specific service component based on (a) a first optimization metric and (b) a second optimization metric, wherein:

the first optimization metric is associated with processing the input workload on the first set of simulation models, the second optimization metric is associated with processing the input workload on the second set of simulation models, and the selected variant of the provider-specific service component is associated with the optimization metric that satisfies the at least one objective.

\* \* \* \* \*